US010890498B2

(12) United States Patent
Benech et al.

(10) Patent No.: US 10,890,498 B2
(45) Date of Patent: Jan. 12, 2021

(54) SENSOR FOR A PHYSICAL FEATURE, PREFERABLY COMPRISING A MULTILAYER STRUCTURE

(71) Applicant: UNIVERSITE DE BRETAGNE SUD, Lorient (FR)

(72) Inventors: Gabriel Benech, Paris (FR); Jean-Marc Legrand, Equemauville (FR); Jean-François Feller, Quéven (FR); Mickaël Castro, Lorient (FR); Tran Than Tung, South Australia (AU)

(73) Assignee: UNIVERSITE DE BRETAGNE SUD, Lorient (FR)

(*) Notice: Subject to any disclaimer, the term of this patent is extended or adjusted under 35 U.S.C. 154(b) by 153 days.

(21) Appl. No.: 15/740,407

(22) PCT Filed: Jul. 8, 2016

(86) PCT No.: PCT/EP2016/066348
§ 371 (c)(1),
(2) Date: Dec. 28, 2017

(87) PCT Pub. No.: WO2017/009256
PCT Pub. Date: Jan. 19, 2017

(65) Prior Publication Data
US 2018/0195914 A1 Jul. 12, 2018

(30) Foreign Application Priority Data
Jul. 10, 2015 (FR) ........................ 1556583

(51) Int. Cl.
*G01L 1/22* (2006.01)
*H01B 1/24* (2006.01)
(Continued)

(52) U.S. Cl.
CPC ............. *G01L 1/2287* (2013.01); *C08J 5/042* (2013.01); *C08K 5/0025* (2013.01); *C08L 47/00* (2013.01);
(Continued)

(58) Field of Classification Search
CPC ....... G01L 1/2287; G01L 1/18; G01L 1/2293; G01D 21/00; C08L 83/04; C08L 75/04;
(Continued)

(56) References Cited

U.S. PATENT DOCUMENTS 6,835,311 B2 * 12/2004 Koslow ................... C02F 1/444
210/490
7,730,547 B2   6/2010 Barrera et al.
(Continued)

FOREIGN PATENT DOCUMENTS

CN    101480858 A    7/2009
CN    101798462 A    8/2010
(Continued)

OTHER PUBLICATIONS

International Search Report for corresponding International Application No. PCT/EP2016/066348 dated Nov. 15, 2016.
(Continued)

*Primary Examiner* — Freddie Kirkland, III
(74) *Attorney, Agent, or Firm* — Pearne & Gordon LLP

(57) ABSTRACT

The invention relates to a sensor for a physical feature, comprising a structure, preferably a multilayer structure, comprising: at least one electrically conductive layer, comprising nanofillers in a polymer matrix including at least one polymer, and electrical connection means, said structure being thermosetting, thermoplastic, or being a cross-linkable elastomer, characterised in that, when the structure is thermosetting, the degree of cross-linking thereof is higher than 80%, better still higher than 90%, or even 95%; when the
(Continued)

structure is a cross-linkable elastomer it includes an amount of cross-linking agent ranging from 5 mol. % to 20 mol. % relative to the number of moles in the structure; and when the structure is thermoplastic, it has a constant resistivity value and preferably a degree of crystallinity ranging from 0% to 60%.

15 Claims, 14 Drawing Sheets

(51) Int. Cl.

| | | |
|---|---|---|
| G01D 21/00 | (2006.01) | |
| G01L 1/18 | (2006.01) | |
| C08J 5/04 | (2006.01) | |
| C08K 5/00 | (2006.01) | |
| C08L 47/00 | (2006.01) | |
| C08L 75/04 | (2006.01) | |
| C08L 83/04 | (2006.01) | |
| B82Y 30/00 | (2011.01) | |
| H01B 1/22 | (2006.01) | |

(52) U.S. Cl.
CPC ............... *C08L 75/04* (2013.01); *C08L 83/04* (2013.01); *G01D 21/00* (2013.01); *G01L 1/18* (2013.01); *G01L 1/2293* (2013.01); *H01B 1/24* (2013.01); *B82Y 30/00* (2013.01); *C08L 2203/20* (2013.01); *H01B 1/22* (2013.01)

(58) Field of Classification Search
CPC ... C08L 47/00; C08L 2203/20; C08K 5/0025; C08J 5/042; H01B 1/24; H01B 1/22; B82Y 30/00
See application file for complete search history.

(56) References Cited

U.S. PATENT DOCUMENTS

| | | | | |
|---|---|---|---|---|
| 7,803,740 B2* | 9/2010 | Bicerano | ................ | C09K 8/035 |
| | | | | 507/117 |
| 8,661,917 B2* | 3/2014 | Jheng | ....................... | H01B 1/24 |
| | | | | 73/862.68 |
| 8,785,521 B2* | 7/2014 | Miller | .................... | H01B 3/002 |
| | | | | 523/210 |
| 9,671,297 B2* | 6/2017 | Sibbett | ..................... | B25J 19/02 |
| 9,705,056 B2* | 7/2017 | Amako | .................... | G02B 1/04 |
| 9,708,451 B2* | 7/2017 | Lewicki | ............... | C08K 5/5419 |
| 9,927,703 B2* | 3/2018 | Swier | ...................... | B32B 27/28 |
| 10,125,243 B2* | 11/2018 | Korzhenko | ............. | B29C 48/45 |
| 10,399,322 B2* | 9/2019 | Shah | ...................... | B33Y 10/00 |
| 2009/0181239 A1 | 7/2009 | Fan et al. | | |
| 2012/0090408 A1* | 4/2012 | Jheng | ...................... | H01B 1/24 |
| | | | | 73/862.68 |
| 2013/0118267 A1 | 5/2013 | Suzuki et al. | | |
| 2013/0201605 A1* | 8/2013 | Miller | .................. | C08K 5/5419 |
| | | | | 361/311 |
| 2014/0331793 A1 | 11/2014 | Suzuki et al. | | |
| 2015/0147506 A1 | 5/2015 | Korzhenko et al. | | |
| 2015/0174860 A1 | 6/2015 | Ellis et al. | | |
| 2015/0292964 A1* | 10/2015 | Sibbett | .................. | G06F 3/0414 |
| | | | | 73/862.632 |

FOREIGN PATENT DOCUMENTS

| | | |
|---|---|---|
| CN | 102374910 A | 3/2012 |
| CN | 102692288 A | 9/2012 |
| CN | 103105123 A | 5/2013 |
| CN | 103889711 A | 6/2014 |
| CN | 104142118 A | 11/2014 |
| CN | 104257367 A | 1/2015 |
| DE | 691 31 787 T2 | 6/2000 |
| FR | 2 991 330 A1 | 12/2013 |
| KR | 10-2010-0099586 A | 9/2010 |
| TW | 201216302 A | 4/2012 |
| WO | 91/19297 A1 | 12/1991 |

OTHER PUBLICATIONS

Written Opinion for corresponding International Application No. PCT/EP2016/066348 dated Nov. 15, 2016.

Mai Fang et al: "Poly(lactic acid)/carbon nanotube nanocomposites with integrated degradation sensing", Polymer, vol. 54, No. 25, Oct. 25, 2013 (Oct. 25, 2013), pp. 6818-6823, XP028773792.

Chinese Office Action dated Dec. 10, 2019 for corresponding Chinese Application No. 2016800409044 and English translation.

* cited by examiner

SENSOR FOR A PHYSICAL FEATURE, PREFERABLY COMPRISING A MULTILAYER STRUCTURE

The present invention relates to the field of sensors which are in particular in the form of patches intended to be integrated into a device to be controlled. The device to be controlled may for example be a leaktight seal, a cable, for example a shroud, a tube, for example made of polyurethane-covered steel or made of attacked steel, a part made of a composite material, for example for the aeronautical, automobile, water-turbine or wind-turbine industries.

The sensor may be intended to monitor a physical characteristic, for example to detect the presence of a chemical compound, in particular an organic chemical compound, on the basis of the physicochemical interactions with the molecules, or a stress, a crack, the fatigue of a material, or else a deformation, such as the creep of a material, or else a temperature.

The invention relates more particularly to sensors comprising a composite structure formed from conductive materials and from polymer materials, such structures being alternatively called conductive polymer composites (CPCs). These structures have a strong potential as high-performance multifunctional materials.

The invention also relates to the processes for producing such sensors, and to the uses thereof.

A CPC sensor containing carbon nanotubes is known for example through patent U.S. Pat. No. 7,730,547.

There is a need to improve these sensors, the manufacture thereof and the possible uses thereof in multiple fields where the monitoring of certain physical characteristics may be of use.

The invention aims to meet all or some of these needs and has, as subject, according to a first of its aspects, a sensor for a physical characteristic, comprising a structure, preferably a multilayer structure, comprising:
at least one electrically conductive layer, comprising nanofillers, which may in particular be coated or functionalized, in a polymer matrix comprising at least one polymer, and
electrical connection means,
said structure being thermosetting or thermoplastic or being a crosslinkable elastomer and
when the structure is thermosetting, then the degree of crosslinking thereof is greater than 80%, better still greater than 90%, or even greater than 95%,
when the structure is a crosslinkable elastomer, then it comprises an amount of crosslinking agent ranging from 5 mol % to 20 mol % relative to the number of moles of the structure, and
when the structure is thermoplastic, then it has a constant resistivity value and preferably a degree of crystallinity ranging from 0% to 60%.

Advantageously, the degree of crystallinity of the thermoplastic structure ranges from 0% to 60%, preferably from 0% to 30%. When the degree of crystallinity of the thermoplastic structure is zero, it is then an amorphous material.

Preferably, said structure comprises at least one insulating layer, comprising at least one polymer, said polymer possibly being identical to or different than the polymer of the electrically conductive layer. In this case, the structure is said to be multilayer.

The sensors according to the invention have properties that are satisfactory or even superior to the prior art sensors in terms of rigidity, lifetime, sensitivity, that is to say in terms of accuracy of the data collected on the device to be controlled.

Definitions

The following definitions and abbreviations are used in the present text.

The term "insulating layer" is intended to mean a layer that is electrically insulating and/or protective against external attacks.

The term "conductive architecture" is intended to mean all of the electrically conductive layers, this "conductive architecture" also being called "transducer".

The term "preform", "prepreg" or "preimpregnated" is intended to denote the sensor precursor. The "sensor precursor" is prepared beforehand and the conversion thereof into a "sensor" (curing) is carried out only at the moment the structure that it is desired to instrument is used.

Preferably, the sensor is in the form of a patch.

The term "patch" is intended to denote an adhesive system that is small in size compared with the size of the device to be controlled in general.

In one implementation variant, the dimensions of the patch may be the following: the length ranges from 1000 µm to 15 mm, the width ranges from 500 µm to 10 mm, the thickness ranges from 0.1 µm to 0.001 mm.

Thus, the dimensions of the patch are length/width/thickness [1000 µm×500 µm×0.1 µm] to [15 mm×10 mm×0.001 mm].

The percolation threshold $\Phi_c$ may be defined as the minimum amount of conductive fillers required to render a composite polymer electrically conductive according to the percolation law defined by Eq. 1:

$$\rho = \rho_0(\emptyset - \emptyset_c)^{-t} \quad \text{Eq. 1}$$

With $\rho$ being the resistivity of the electrically conductive composite polymer, $\rho_0$ the resistivity of the conductive fillers, $\phi$ the volume fraction of the conductive fillers in the polymer composite, $\phi_c$ the volume fraction of fillers that are conductive to percolation and t the critical exponent.

The critical exponent corresponds to the slope of the curve at the time of percolation.

The degree of crosslinking corresponds to the degree of progression of the chemical reaction enabling the formation of a three-dimensional macromolecular network. It is determined either by measurements of swelling in a solvent of the polymer, or from the value of the elastic modulus at the rubber plateau or else by differential scanning calorimetry (DSC).

In particular, the degree of crosslinking may be determined by means of Eq. 2:

$$\text{Degree of crosslinking} = 100 \, [1-(\Delta H/\Delta H_{ref})];$$

in which $\Delta H$ is the residual enthalpy of reaction of the partially crosslinked polymer or polymer blend (the crosslinking of which is continued up to its maximum) and $\Delta H_{ref}$ is the enthalpy of reaction of the same initially non-crosslinked polymer or polymer blend, the crosslinking of which is continued up to its maximum.

The $\Delta H$ and $\Delta H_{ref}$ measurements are standardized relative to the weight of the samples in order to allow them to be compared even if the amounts differ.

In the case of crosslinkable elastomers, the nature of the crosslinking agent is not limiting, it is within the competence of those skilled in the art to select the crosslinking agent according to the elastomer used.

For elastomers which have carbon-carbon double bonds >C═C<, such as natural rubber or SBR, the crosslinking may be carried out by means of a sulfur-based crosslinking/vulcanizing agent which forms mono-, di- or polysulfide bridges, denoted R—Sx-R' (R and R' representing chains of the elastomer; x may reach approximately ten).

For polyurethanes, they are the result of a chemical reaction between polyols and diisocyanates (that may be considered to be crosslinking).

The degree of crystallinity by weight is determined by differential scanning calorimetry (DSC) in accordance with the equation above. It corresponds to the proportion of polymer which is in the crystalline state.

The following abbreviations are used
CNTs: carbon nanotubes,
CNPs: carbon nanoparticles,
GRs: graphene lamellae,
PU: poly(urethane),
EP: poly(epoxide),
PS: poly(styrene),
aPS: atactic poly(styrene),
PMMA: poly(methyl methacrylate),
PC: poly(carbonate),
PET: poly(ethylene terephthalate),
PLA: poly(lactic acid),
PVA: poly(vinyl acetate),
GFs: glass fibers.

Advantages

The fact that the sensors according to the invention are integrated into a device to be controlled, in particular in the form of patches, leads to numerous advantages.

First of all, this patch form enables a limited intrusion into the device to be controlled, the intrusion is thus local in nature, is moderate and thus results in good preservation of the integrity of said device.

The use in patch form also makes it possible to distribute the sensors over the entire device to be controlled. A judicious distribution of the patches may make it possible to obtain both local information at the level of each patch, and general information by taking into consideration the information obtained by all the patches, making it possible to obtain information on the state of the entire device to be controlled.

These surface sensors have functionalities similar to those of the metal strain gauges conventionally used; however, the sensors according to the invention have the advantage of making it possible to adjust the sensitivity easily by modification of the formulation of the sensor or of the structuring thereof. The gauge factor (cf. Eq. 2) may thus be increased by 2 to 10 times by changing the shape or the size of the sensor so that it may integrate the strain information on more or less large surfaces. Furthermore, the strain range may itself also be adjusted according to the strain at break of the substrate.

$$GF = \frac{\Delta R}{\Delta \epsilon} \qquad \text{Eq. 2}$$

wherein $\Delta$ is the variation (of R or $\epsilon$), R is the resistance and $\epsilon$ the strain.

The invention may also make it possible to provide information on the actual health of the material on which the sensor is deposited.

The sensor may comprise a layer of substrate, which is preferably the insulating layer, on which the electrically conductive layers are deposited. The substrate may comprise a material different than the multilayer structure.

Advantageously, the substrate is an insulating layer, comprising at least one polymer, said polymer possibly being identical to or different than the polymer of the electrically conductive layer.

As a variant, the sensor may be devoid of a substrate layer; in this case, it is deposited directly on the device to be controlled, for example by means of a mask, as described below.

According to one advantageous variant of the invention, the multilayer structure may be folded in half. The term "folded in half" is intended to mean that the multilayer structure has a flattened configuration folded on itself.

Electrically Conductive Layer

The nanofillers may be chosen from the following list in isolation or in combination with one another in the form of hybrids: nanoparticles, nanotubes, nanolamellae, nanowires, made of carbon or metal, for instance carbon nanoparticles, carbon black, carbon nanotubes, graphene, or else fullerenes, metal nanoparticles, silver nanoparticles, gold nanoparticles, nickel nanoparticles, this list not being limiting.

The nanofillers may be coated in particular by means of a binder such as PVA or EP.

The nanofillers may be grafted with alcohol, acid or amine functions, in particular in order to increase the dispersibility thereof in the polymer matrices or to reduce the level of aggregation. The nanofillers may also be functionalized with larger molecules, in particular oligomers comprising from 5 to 30 units that are compatible with the polymer matrix, in order to control the inter-particulate gap at the electrical nanojunctions of the percolated network. The coating may thus provide greater physical homogeneity and greater electrical sensitivity.

Preferably, the particles are such that their largest dimension ranges from 1 to 1000 nm, better still from 10 to 100 nm, for example is about 15 nm.

The nanotubes preferably have a length of a few hundred to a few thousand nm, for example ranging from 100 to 10 000 nm.

The presence of these nanofillers makes it possible to provide the electrical conduction in the electrically conductive layers. In order to ensure the conduction, the nanofillers must be present in an amount greater than the percolation threshold so as to be suitably interconnected, but their concentration must not be too high, otherwise they may prevent any disconnection of the percolated network and thus considerably reduce the response of the sensors.

The term "percolation threshold" is intended to mean $\phi_c$ the amplitude determined by Eq. 1 (above). The proportion of nanofillers in the polymer matrix may be between 0.1% and 30% by volume (v/v), or even between 0.5% and 5% v/v, for example about 1.5% v/v.

The sensor according to the invention comprises at least one electrically conductive layer, in particular at least two electrically conductive layers, or even at least three electrically conductive layers.

When the sensor comprises at least two electrically conductive layers, the structure is said to be multilayer.

The number of electrically conductive layers ranges from 1 to 100 layers, or even from 2 to 90, better still from 3 to 80, in particular from 20 to 70, for example from 40 to 50.

The electrically conductive layers may each have a thickness ranging from 20 to 100 nm, preferably from 30 to 60, or even from 40 to 50 nm.

The polymer may be thermosetting, thermoplastic or a crosslinkable elastomer. It is preferably soluble. In one particular embodiment of the invention, it is thermosetting. It is preferably soluble.

The polymer matrix of the electrically conductive layer may comprise at least one polymer chosen from the following list, which is not limiting: an elastomer, for example poly(siloxane), poly(urethane), poly(isoprene) and poly(butadiene).

Advantageously, the amount of nanofillers in each electrically conductive layer is greater than the percolation threshold.

Advantageously, each electrically conductive layer has a controlled conductivity, that is to say a conductivity corresponding to a predetermined value.

Each electrically conductive layer has a resistivity ranging from 0.5 kΩ to 5 MΩ.

All of the electrically conductive layers, also called transducer, have a resistivity ranging from 0.5 kΩ to 5 MΩ.

Electrical Connection Means

The electrical connection means (electrodes) may be electrically conductive wires or electrically conductive fibers having a first end in contact with at least one of the electrically conductive layers. A conductive adhesive very highly loaded with metal particles such as Ag may also be used to improve the contacts.

These wires may have a second end which may be accessible from the exterior of the sensor. These electrical connection means may thus make it possible to transmit, to the exterior of the sensor, information regarding the physical characteristic.

One variant consists in drawing/printing conductive paths using a conductive ink, which may or may not require curing, in order to produce electrodes which make it possible to dispense with wires or fibers described above.

Once extracted from the sensor, this information may be transmitted in the form of a signal to an analytical tool, and may then be analyzed in order to pinpoint possible abnormalities and, as far as is possible, to give a maximum amount of information regarding the device to be controlled in which the sensor may be integrated. The transmission may be carried out in several ways: either directly, that is to say via a simple wire link, or, in order to improve the quality of the wire transmission, the signal may be amplified and/or filtered. This solution may in particular be envisioned in the case where the analytical tool is remote. A wireless transmission implies the presence of an emitter and of a receptor at a distance which allows sufficiently correct transmission. Multiplexing may make it possible to transmit several signals on one and the same channel.

In addition, a wireless connection may also be put in place; in this case, the sensors connected for example to an RFID antenna may transmit the information remotely and between one another. The antenna may be passive or active (electrically powered).

The analysis may itself also be carried out in several ways: either via direct analysis of the analog signal, or after calibration and digitization of the signal.

The solutions proposed here may be adapted as required, and it is, for example, possible to combine several types of transmission or to digitize the signal for the purpose of transmitting it. Furthermore, amplification, filtering and multiplexing do not constitute an exhaustive list of the means for improving the signal transmission.

Insulating Layer

The polymer(s) of the insulating layer is (are) also chosen from the following list, which is not limiting: an elastomer, for example poly(siloxane), poly(urethane), poly(isoprene) and poly(butadiene).

The polymer may be thermosetting or thermoplastic. It is preferably soluble. In one particular embodiment of the invention, it is thermosetting. It is preferably soluble.

The polymer of the electrically conductive layer(s) and the polymer of the insulating layer may be identical or different. In addition, they may or may not be compatible.

The term "compatible polymers" is intended to mean polymers capable of forming an intimate mixture at the molecular level when they are mixed in equal weight amounts.

Preferably, the polymer of the electrically conductive layer and the polymer of the insulating layer are compatible. Preferably, they are identical.

A subject of the invention is also, independently or in combination with the aforementioned, a process for producing a sensor precursor and a process for producing a sensor as defined above.

One particularly preferred process is a process which implements at least one step of spraying layer by layer, also referred to as sLbL.

A subject of the invention is in particular, independently or in combination with the aforementioned, a process for producing a precursor of a sensor for a physical characteristic, comprising a multilayer structure, comprising the following steps:

a) a solution is prepared by mixing nanofillers and a polymer in a solvent, b) a layer of this solution is deposited on an insulating polymer layer, c) the layer thus formed is left to stand so as to allow the solvent to evaporate off and to form a film, d) the electrical conductivity of the electrically conductive layer thus formed is measured, e) as long as the electrical conductivity of the electrically conductive layer does not reach a predetermined value, steps b) to d) are repeated, f) optionally, an insulating polymer layer is deposited on the electrically conductive layers thus formed.

As mentioned in step e) it is possible to repeat steps b) to d) several times depending on the desired number of electrically conductive layers and depending on the electrical conductivity value to be achieved.

Generally, steps b) to d) are repeated a number of times ranging from 1 to 99, or even from 1 to 89, better still from 2 to 79, in particular from 19 to 69, for example from 39 to 49.

Advantageously, step a) is carried out with agitation by ultrasound.

Advantageously, at least one step b), preferably all the steps b), is (are) carried out by spraying, in particular by spraying layer by layer, otherwise referred to as sLbL. According to this process, the solution deposited forms a this liquid layer consisting of microdroplets of a few microns to a few tens of microns which coalesce so as to form a continuous film.

Preferably, the solution deposited forms a film with a thickness ranging from 30 to 50 nm; the thicknesses of two layers deposited during two successive steps b) may be identical or different.

This approach allows a fine control of the structure of the layer, both on the macroscopic scale and on the microscopic scale.

It also makes it possible to control the final conductivity, that is to say a conductivity corresponding to a predetermined value.

The value of the final conductivity will depend on factors such as the level of strain, the size of the sensor, the intended use, etc.

The insulating polymer layer is produced by spraying a solution of polymer or of polymer blend. In the case of the precursor, the support may be a partially crosslinked thermoplastic or thermosetting polymer film, that is sufficiently rigid for it to be able to be handled.

In step c) it is possible to leave to stand for a period including from 1 s to 10 min, or even from 20 s to 1 min, for example for a period of 30 s.

According to another of its aspects, the present invention also relates to the sensor precursor directly obtained by means of the process below.

This sensor precursor advantageously has one or more electrically conductive layer(s), each of which has a controlled conductivity.

The sensor precursor may thus be kept, in particular away from heat and light, up to the time the sensor is prepared.

A subject of the invention is also, independently or in combination with the aforementioned, a process for producing a sensor for a physical characteristic, comprising a multilayer structure, wherein the process for producing a precursor of a sensor for a physical characteristic according to the invention is carried out on an insulating polymer layer which is made of a thermosetting or thermoplastic material or which is a crosslinkable elastomer, comprising an amount of crosslinking agent ranging from 5 mol % to 20 mol % relative to the number of moles of the structure, said process being followed by a curing step such that:
- when the insulating polymer layer is made of a thermosetting material, the curing step is carried out until a degree of crosslinking of said layer greater than 80%, better still greater than 90%, or even greater than 95%, is obtained;
- when the insulating polymer layer is made of a crosslinkable elastomer, the curing step is carried out until a constant crosslinking value is obtained;
- when the insulating polymer matrix is made of a thermoplastic material, the curing step is carried out until a constant resistivity value is obtained;
- after the curing step, the sensor obtained is cooled or left to cool.

In the case of a thermoplastic material, the curing step allows a dynamic percolation.

In the case of a thermoplastic material, the cooling is carried out so as to obtain a degree of crystallinity ranging from 0% to 60%, preferably from 0% to 30%.

According to another of its aspects, the present invention also relates to the sensor directly obtained by means of the above process.

Thermosetting Material

The treatment of the thermosetting material is preferably a curing of the sensor for a predetermined period of time at a predetermined temperature according to a predetermined curing cycle.

The curing cycle may have a time of between 1 h and 20 h, for example of between 4 h and 16 h, being for example about approximately 10 h.

The curing cycle may consist in heating at a temperature that may reach a maximum temperature for a limited period, the maximum temperature being between 80 and 400° C., or even between 100 and 150° C., being for example about 120° C.

The degree of crosslinking of the electrically conductive layer may be measured, after taking a sample of the electrically conductive layer, by Differential Scanning calorimetry (DSC), by Dynamic Mechanical Thermal Analysis (DMTA), by weighing the weight of solvent sorbed into the material, or by measuring the electrical conductivity. Preferably, the reaction enthalpies will be measured by DSC in order to calculate the degrees of crosslinking of the (blends of) polymers, as defined by Equation 2 above.

When the (predetermined) value of the degree of crosslinking is reached, the curing is stopped.

Thermoplastic Material

The treatment of the thermoplastic material is preferably a curing of the sensor precursor for a predetermined time at a predetermined temperature and cooling at a controlled rate according to a predetermined curing cycle.

The resistivity may be easily monitored by connecting the electrodes of the connected to the conductive layer to a multimeter.

Crosslinkable Elastomer

The treatment of the thermoplastic material is preferably a curing of the sensor precursor for a predetermined time at a predetermined temperature and cooling at a controlled rate according to a predetermined curing cycle.

The degree of crosslinking may be easily measured for example by differential scanning calorimetry (DSC).

Leaktight Seal

A subject of the invention is also, independently or in combination with the aforementioned, a leaktight seal comprising at least one sensor for a physical characteristic, comprising a multilayer structure comprising:
- at least one, in particular at least three, electrically conductive layers comprising nanofillers, which may in particular be coated, in a polymer matrix comprising at least one polymer, and
- electrical connection means, the multilayer structure having in particular been subjected to a controlled curing cycle.

A subject of the invention is in particular a leaktight seal comprising a precursor of a sensor or a sensor as defined above, or prepared according to the process as defined above, or comprising at least one sensor precursor prepared according to the process as defined above.

This seal may in particular be advantageously used in nuclear power stations.

There are several categories or types of seals with various materials, for example stainless steel and graphite, graphite compressed between two steel rings; elastomers for the chemical and petrochemical industry, steel and thermiculite (exfoliated vermiculite) for resistance to high temperatures and to acids; fiber-elastomers, PTFE, elastomer, graphite, mica for industry.

The sensor or the sensor precursor may be integrated in the leaktight seal in the following way: at least one sensor or a sensor precursor is inserted at the surface or on the edge of the seal. As a variant or additionally, at least one sensor or sensor precursor may be inserted inside the seal.

For example, the leaktightness of a bolted assembly of a steam generator, termed SG, is obtained by the positioning of a specific seal.

This seal is produced according to the technical criteria of said assembly and may be produced with several types of materials, generally made of stainless steel with an insertion of pure graphite.

The integration of an "intelligent" or "communicating" sensor according to the invention in a leaktight seal will make it possible to prevent leakage and also enable better targeted preventive maintenance, hence a very high level of safety and great saving of costs.

According to a first variant, the leaktight seal comprises a sensor for a physical characteristic according to the present invention, comprising a structure, preferably a multilayer structure, said structure being thermosetting.

According to a second variant, the leaktight seal comprises a sensor for a physical characteristic according to the present invention, comprising a structure, preferably a multilayer structure, said structure being thermoplastic.

According to a third variant, which is preferred, the leaktight seal comprises a sensor for a physical characteristic according to the present invention, comprising a structure, preferably a multilayer structure, said structure being a crosslinkable elastomer.

Composite Material

A subject of the invention is also, independently or in combination with the aforementioned, a composite material comprising a sensor precursor or a sensor as defined above or prepared according to the process as defined above.

At least one sensor precursor or one sensor may be inserted directly at the surface of fibers of said composite material, for example of glass fibers or of carbon fibers of the composite material. In the case of a composite material made of carbon fibers, the addition of an insulating polymer layer is required in order to insulate the sensor precursor or the sensor from the layer of carbon fibers.

As a variant or additionally, at least one sensor precursor or one sensor may be inserted into a matrix, for example a polymer matrix, of the composite material.

The composite material may comprise at least one sensor precursor or one sensor inserted into a matrix, for example a polymer matrix of the composite material.

A polymer matrix of the composite material may comprise a polymer that is compatible with, or even identical to, a polymer of the insulating polymer layer of the sensor or of the sensor precursor, for example in order to render the sensor non-intrusive, that is to say that it does not modify the mechanical properties of the composite, in particular it is not responsible for initiating cracks leading to damage.

This is, for example, the case when the polymer matrix of the composite material is a poly(epoxide) EP, a poly(ester), a poly(urethane), a poly(ether ketone) or a poly(amide).

According to a first variant, the composite material comprises a sensor for a physical characteristic according to the present invention, comprising a structure, preferably a multilayer structure, said structure being thermosetting.

According to a second variant, the composite material comprises a sensor for a physical characteristic according to the present invention, comprising a structure, preferably a multilayer structure, said structure being thermoplastic.

According to a third variant, the composite material comprises a sensor for a physical characteristic according to the present invention, comprising a structure, preferably a multilayer structure, said structure being a crosslinkable elastomer.

A subject of the invention is also, independently or in combination with the aforementioned, the use of a sensor as described above or prepared according to the process as defined above or comprising a sensor precursor prepared according to the process as defined above, in a cable or in the production of a cable.

A subject of the invention is also, independently or in combination with the aforementioned, the use of a sensor as described above or prepared according to the process as described above or comprising a sensor precursor prepared according to the process as defined above, in a tube or in the production of a cable.

This tube may in particular be advantageously used in nuclear power stations.

A subject of the invention is also, independently or in combination with the aforementioned, the use of a sensor precursor or of a sensor as described above in a composite structure for civil engineering infrastructures or else the use of a sensor precursor or of a sensor as described above in the production of a composite structure for civil engineering infrastructures.

A subject of the invention is also, independently or in combination with the aforementioned, the use of a sensor precursor or of a sensor as described above in a structural element in the aeronautical or automobile industry or of a sensor precursor or of a sensor as defined above in the production of a structural element in the aeronautical or automobile industry.

A subject of the invention is also, independently or in combination with the aforementioned, the use of a sensor as described above or prepared according to the process as defined above or comprising a sensor precursor prepared according to the process as defined above in a wind turbine, a turbine or a water turbine or in the production of a wind turbine, a turbine or a water turbine.

DETAILED DESCRIPTION

The invention will be understood more clearly on reading the detailed description that will follow, of examples of implementation of the invention, and on examining the appended drawing in which.

Sensor

In the context of the invention, by virtue of the incorporation of one or more electrically conductive layers into an insulating polymer matrix, it is possible to envision an original combination of characteristics, such as low density, flexibility, low cost and mechanical properties, possible resistance to organic compounds, electrical conductivities that are high.

One of the advantages of CPCs, in particular in patch form, is their polyvalence and their production, proportioning and usage versatility.

The incorporation of the electrically conductive layers into the insulating polymer matrix is preferably carried out at a content greater than a percolation threshold.

Because of the ease with which they are processed by the molten or solvent route, and the possibility of adjusting their properties through the formulation and the process, the CPC sensors according to the invention, in particular in patch form, may target a wide range of applications, in particular those requiring a material that may be stimulated by a variation in an environmental parameter such as the temperature, the gas or liquid atmosphere, but also the pressure or the field of constraint.

The parameters of influence on the percolation of nanofillers in the CPC sensors, the thermoresistive behavior of the CPCs, the chemiresistive behavior of the CPCs, and the piezoresistive behavior of the CPCs are described in J. F. Feller, M. Castro, B. Kumar, "*Polymer CNT conductive nanocomposite for sensing*" in Polymer carbon nanotube composites: Preparation, Properties & Applications, Ed. T. McNally, Whoodhead Publishing Ltd, Cambridge, UK, Chap. 25, pp 760-803, ISBN 1845697618 (2011).

Figure 1:
FIG. 1 represents nanobundles of carbon nanotubes observed by scanning electron microscopy.

In the sensor according to the invention, it is possible to use multifunctional conductive nanofillers with a high aspect ratio, such as nanoparticles, nanofibers, nanotubes or nanolamellae of carbon or metal (Au, Ag, Ni), or a combination of these fillers. Nanobundles of carbon nanotubes observed by scanning electron microscopy have been shown in FIG. 1.

The invention makes it possible to obtain very sensitive CPC sensors.

The characteristics of the CPC sensors according to the invention will now be described in detail.

CPC Sensor Characteristics

The conductive polymer composite sensors, also called "CPC sensors" or more generally "CPCs" according to the invention may be used in various forms for monitoring the deformations and the health of materials owing to their original piezoresistive properties. Carbon nanotubes (CNTs) may be used to produce "intelligent" materials capable of detecting deformations, stresses and impacts, by virtue of the detection of the variations in electrical or thermal conductivity or in photoluminescence. Nanotube-based films may be used for controlling devices such as, for example, aircraft wings.

A subject of the invention is also, independently or in combination with the aforementioned, a composite material comprising a sensor as defined above.

The sensor may be integrated into the composite material in the following way: it may be integrated directly at the surface of fibers, therefore at the interface between the fibers and the matrix of said composite material, for example glass fibers or carbon fibers of the composite material, or into a polymer matrix, for example between two folds of resin-impregnated fibers of the composite material.

Surface Coatings

The CPCs may, as a variant, be used to form surface coatings capable of making it possible to monitor the health of structures in the aeronautical field by virtue of a CNT-loaded PU- or EP-based spray paint. The formulation of the paint may comprise numerous additives in addition to the CNTs. The sensor according to the invention enables, in these applications, an excellent control of the multi-scale structure of nanofillers, in particular of CNTs, in particular by virtue of the sLbL process; it is thus possible to dispense with the additives, other than the nanofillers and the polymer(s) in which they are formulated, which might interact with the nanofillers; the curing is perfectly controlled, as is its influence on the gauge factor. It is thus possible to adjust the sensitivity of the sensors on the basis of the curing time/temperature couple for a given formulation.

Sensor at the Surface of Materials

The invention also makes it possible to obtain CNT-based sensors for measuring various types of deformations in tension, compression or torsion, and also for monitoring plastic deformations and/or damage.

The use of skins of thermoplastic CPCs capable of monitoring the deformation of thermoplastic composite materials may in particular be implemented with an sLbL deposit of thin films of CNT-loaded CPCs initially dispersed in various amorphous polymers, such as poly(styrene) aPS, poly(methyl methacrylate) PMMA, and poly(carbonate) PC, on boat sail fabrics made of poly(ethylene terephthalate) PET, and on fabrics of cotton and of poly(urethane) so as to monitor the deformation thereof. This type of sensor may also be integrated into thermoplastic composites.

It is also possible to produce a cast sensor by dispersing carbon nanoparticles (CNPs, carbon black) in a poly(imide) matrix, and by controlling the influence of the curing on its resistance. This type of sensor may be deposited at the surface in order to monitor the deformation of an oar/scull during use.

Use of Core-Integrated Conductive Fibers

As a variant, it is possible to produce the sensor with fibers using CNTs that have been coagulated, that is to say coated in a PVA binder, for monitoring the deformations and damage of glass fiber-epoxy resin GF-EP composites. These fibers may be 40 µm in diameter.

Typical Materials and Formulations

Thermoplastic Matrices

Some examples of thermoplastic matrices that can be used for the production of sensors are poly(carbonate), poly(methyl methacrylate) or poly(styrene). The solvent of these polymers may be chosen on the basis of the intermolecular interaction parameter which itself depends on the solubility parameters.

The choice of this solvent is within the competence of those skilled in the art.

Some of the properties of these polymers are listed in table 1.

TABLE 1

Principal characteristics of the thermoplastic matrices used for the preparation of the CPC sensors

|  | PC | PMMA | aPS |
|---|---|---|---|
| Mp (° C.) | amorphous | 160 | 240 |
| Tg (° C.) | 140 | 109 | 100 |
| Density (g · cm$^{-3}$) | 1.2 | 1.2 | 1.05 |
| Molecular weight (g · mol$^{-1}$) | 32000 | 180000 | 50000 |
| Com. name/supplier | LEXAN 141 R/GE plastics | VQ101S/ROHM | POLYSCIENCE |
| Formula | (PC structure) | (PMMA structure) | (aPS structure) |

Thermosetting Matrices

A bisphenol-A diglycidyl ether (BADGE) poly(epoxide) resin (Epolam 2020©), the chemical formula of which is presented below, supplied by the company Axson, may be crosslinked with an aromatic amine curing agent such as 3-aminomethyl-3,5,5-trimethylcyclohexylamine.

Structure of the Non-Crosslinked Epoxy Prepolymer (0<n<20)

Epolam 2020 was chosen for its low viscosity and its good mechanical properties. Some of them are summarized in table 2.

TABLE 2

Physical properties of the Epolam 2020 resin, of its curing agent and of the mixtures in the standard proportions
Physical properties

|  | Details | Resin | Curing agent | Mixture 66 wt % resin/34 wt % curing agent |
|---|---|---|---|---|
| Ratio of the mixture by weight |  | 100 | 34 |  |
| Ratio of the mixture by volume |  | 100 | 41 |  |
| Viscosity at 25° C. (mPa· s) | Brookfield LTV | 1600 | 35 | 500 |
| Density at 25° C. | ISO 1675 | 1.17 | 0.95 | 1.10 |
| Pot life duration at 25° C. | Gel Timer TECAM |  |  | 135 |

Nanofillers

The nanofillers which may be used for a dispersion in a polymer matrix for the purpose of obtaining a sensitive CPC film are the following: nanocarbons, carbon nanotubes, graphene lamellae (GR), carbon nanoparticles (CNPs) (optionally derived from soot from diesel engines). Metal nanoparticles (Au, Ag, Ni, etc.) or nanoparticles of intrinsically conductive polymer (PaNi, PEDOT, P3HT, etc.) may also be suitable. These fillers may be combined with one another to form hybrids.

The carbon nanotubes (CNTs) may be single-walled, double-walled or multi-walled.

Principle, Performance Levels and Advantages of the Sensors

CPC Sensor Detection Principle

The present invention is based on the following phenomenon: any structural modification of the conductive architecture of sensors comprising electrically conductive nanofillers results in a variation in the inter-particulate distance at the electrical nanojunctions, which results in an exponential variation in the resistance of the sensors, the ohmic component of which is gradually converted to a quantum tunnel component according to the formula of the equation below:

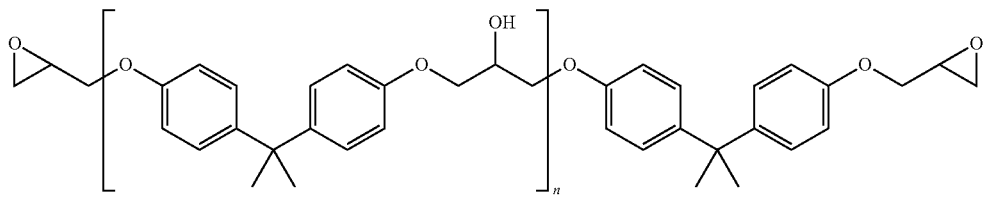

$$R_{tunnel} = \frac{V}{AJ} = \frac{h^2 d}{Ae^2\sqrt{2m\lambda}} \exp\frac{4\pi d}{h}\sqrt{2m\lambda}$$

Thus, it is also possible to consider these sensors as quantum resistive sensors (QRSs).

CPC Sensor Performance Levels

The sensors according to the invention may respond to all types of mechanical, thermal or chemical stresses that may cause the average interparticulate distance in their percolated network to vary. Thus, they are capable of providing piezoresistive responses of static-response, dynamic-response, impact-response or fatigue-response type for various mechanical stresses.

CPC Sensor Advantages

As already mentioned, one of their advantages is their polyvalence and their versatility. The CPC sensors according to the invention may be applied at surfaces, in the core in the matrix or at the interface between the reinforcing fibers and the matrix of a composite material. They may provide information on the elastic, and plastic deformation and up until the composite ruptures. The CPC sensors may monitor the evolution of the damage and the health of a composite at various relevant places that may be predicted by the modeling of the efforts in parts as a function of the specifications. They have no limitations in terms of geometry, i.e. length or thickness, or of implantation.

Preferably, the transducer, i.e. all of the electrical layers, have a size which may range from a few $mm^2$ to a few $cm^2$ over 1 µm of thickness.

The CPC sensors are compatible with most of the manual or automated processes for producing composites by coating, infusion, compression, this list not being limiting.

Production Processes

A subject of the invention is also, independently or in combination with the aforementioned, a process for producing a sensor as defined above.

"Molten" Route

The sensors according to the invention may be produced via the "molten" route by means of a device such as an extruder or an internal mixer which plasticizes the polymer phase through the combination of the shear and the temperature, while at the same time allowing the dispersion of the nanofillers in the polymer matrix.

"Solvent" Route

The sensors according to the invention may be produced via the "solvent" route.

The "solvent" route has the advantage of allowing good control of the level of dispersion of the nanofillers and thus of the performance levels of the sensors. The depositing process associated with the solvent route is often dipping, the dropwise process, casting or more rarely spraying.

The solvent route has the advantage of comprising several adjustable parameters, such as the concentration of polymer and of nanofillers in the solution, the nature of the solvent, and the sonication time, power and temperature. A sonication step (for example: 2 to 6 h at 60° C. in chloroform using a Branson 3510 apparatus of 100 W at 40 kHz) is useful for ensuring good dispersion of the nanofillers and of the macromolecules in solution.

The constituents of the formulation of the CPC sensor to be sprayed are chosen as a function of the type of polymer matrix and of the conductive architecture that are used for producing the composite (capacity for non-intrusive measurement when the polymer used for the CPC sensor is the same as that of the matrix of the composite) and of the nature of the parameters that it is desired to monitor in the material (elastic deformation, plastic deformation, rupture, compression, tension, shear, impact). In the latter case, it is these mechanical and viscoelastic characteristics of the polymer (modulus, degree of crosslinking, plasticity threshold, breaking strength) and these of the nanofiller (electrical conductivity, shape ratio, content) that will condition the performance levels of the CPC sensor.

For example, for producing sensors that can be integrated in structural composites comprising carbon fibers or glass fibers and a poly(epoxy) matrix in order to monitor the health of said composites, a formulation based on poly(epoxy) and on carbon nanotubes (EP-CNT) will be preferred. In this case, it is possible, for example, to disperse from 4 to 8 $g·dm^{-3}$ of a mixture containing 98% by weight of EP and 2% of CNT in chloroform with a view to subsequent spraying.

Hierarchical Structure by Layer-by-Layer Spraying

As already mentioned, one particularly advantageous process for preparing the sensors, and also the sensor precursors, according to the invention is a process implementing a layer-by-layer spraying (sLbL) step.

Figure 2:
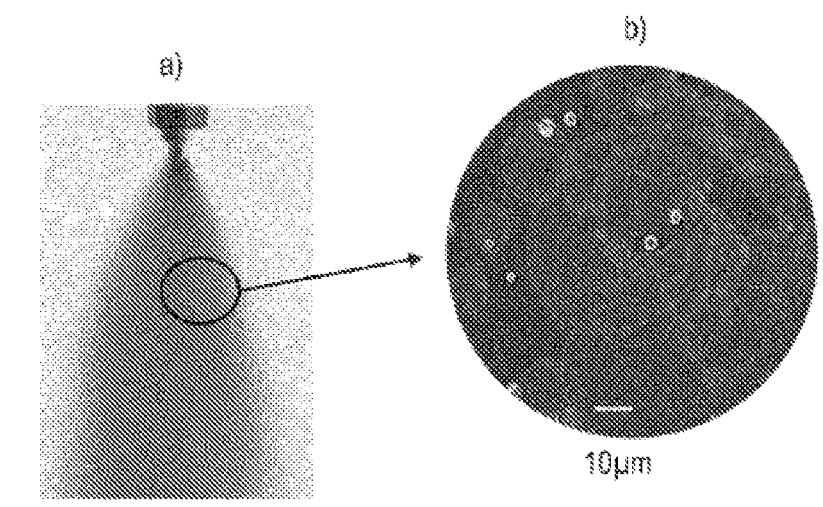
FIG. 2 represents the production of a multilayer sensor with a hierarchical structure: a) spraying, b) microdroplets, c) sensor at the interface between the seal and the flange, d) multilayer structure of the sensor.
Figure 2:
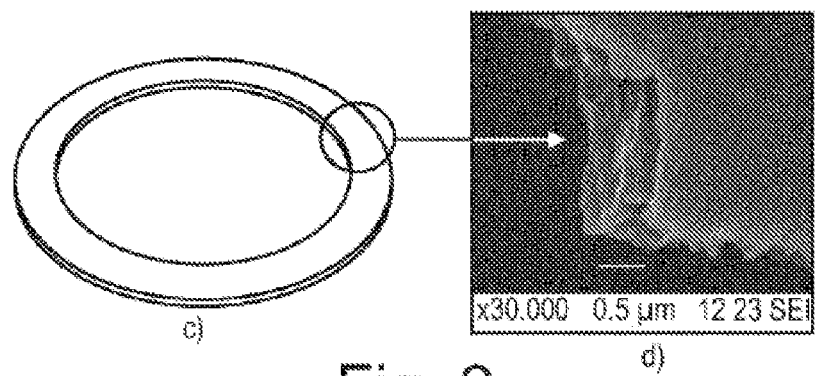

One advantage of the sensors obtained by means of this process lies in the possible control of the structures at the various scales, which makes it possible to provide reproducible and long-lasting properties. From this point of view, the hierarchical multi-scale structures illustrated in FIG. 2, obtained by means of the layer-by-layer spraying (sLbL) process which will be described below, offer a greater guarantee in terms of control of the conductive architecture and, ultimately, of performance levels. The production of a hierarchical-structure multilayer sensor has been illustrated in FIG. 2: a) spraying, b) microdroplets, c) sensor at the interface between the fibers and the matrix, d) multilayer structure of the sensor.

The layer-by-layer spraying (sLbL) of the electrically conductive layer(s) makes it possible to provide a hierarchical structuring (in 3D) from the nanometric scale up to the millimetric scale. In a monolithic system such as a thick film obtained in a single step, it is difficult to control the organization of the nanofillers which may aggregate in an uncontrolled manner at the time the film solidifies. By performing a structuring in steps, the conductive structure may be set in place and may be adjusted as its 3D construction progresses. This process makes it possible to produce from 1 to 100 layers, or even from 2 to 90, better still from 3 to 80, in particular from 20 to 70, for example from 40 to 50.

All of the layers have a thickness ranging from 20 to 2000 nm.

Figure 3:
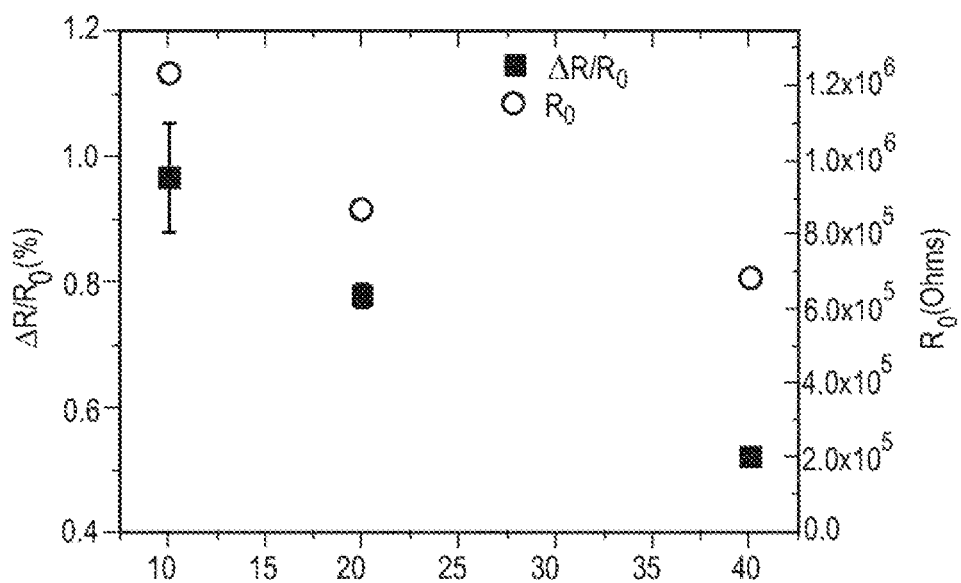
FIG. 3 represents the gauge factor of the sensor adjusted with respect to the number of layers.

This represents an improvement in the process via the solvent route insofar as it is possible to construct the sensor in an additive manner and to use the thickness as an additional adjustable parameter for optimizing the production of the sensor, as may be seen in FIG. 3, in which the variation in resistance $\Delta R/R_0$ has been represented as % and the initial resistance $R_0$ in ohms, as a function of the number of layers.

Typically, spray conditions are used that are similar to those used for the production of the sensors of volatile organic compounds (VOCs) previously developed in the articles M. Castro, J. Lu, S. Bruzaud, B. Kumar, J. F. Feller. Carbon nanotubes/poly(e-caprolactone) composite vapour sensors, *Carbon*, 47, 1930-1942 (2009) and J. F. Feller, J. Lu, K. Zhang, B. Kumar, M. Castro, N. Gatt, H. J. Choi. Novel architecture of carbon nanotube decorated poly(methyl methacrylate) microbead vapour sensors assembled by spray layer by layer, *J. Mater. Chem.* 21, 4142(2011).

The spraying is carried out using a device developed in the laboratory which enables the adjustment of the flow rate of the CPC solution in the nozzle (index from 1 to 5) conditioned by applied compressed-air pressure (for example: $0.01 < p_s = 0.60$ MPa), the distance between the nozzle and the target ($5 < d_{bc} < 20$ cm) and the surface scanning speed ($V_s = 10$ cm·s$^{-1}$). The spraying is carried out at ambient temperature (20-25° C.). The conductivity of the samples is monitored after each layer deposit during the depositing process in order to ensure that the resistance of the film evolves correctly as expected as a function of the number of layers (FIG. 3). After the spray depositing, the samples are dried at ambient temperature for 24 hours under vacuum.

It is possible to measure the average thickness of the sensors measured by AFM and SEM as a function of the number of layers sprayed.

Figure 4:
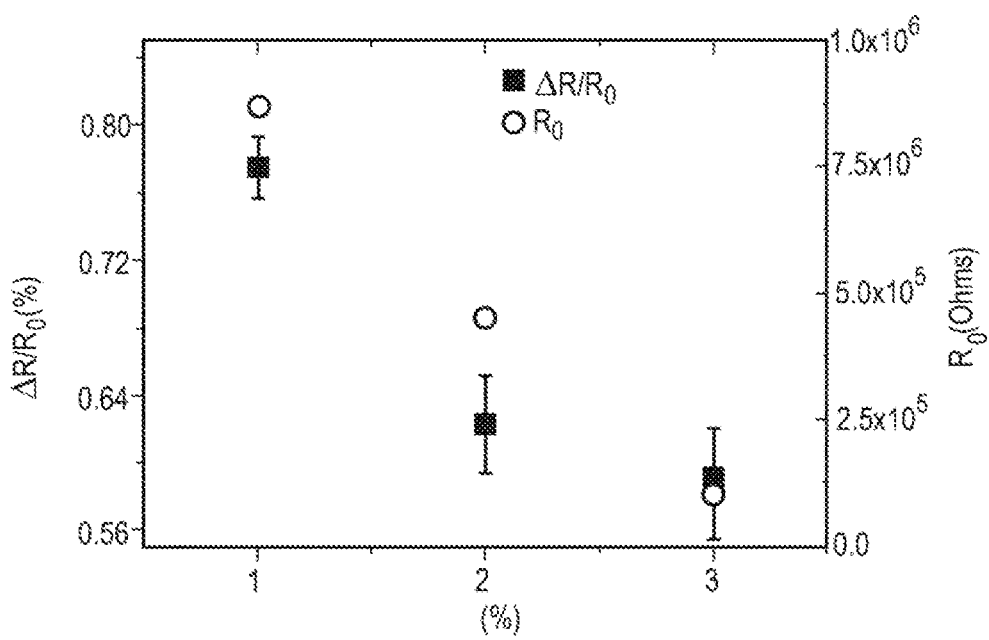
FIG. 4 represents the gauge factor of the sensor adjusted with respect to the nanofiller content.

The % gauge factor Ar of the sensor (sensitivity) adjusted respectively by the number of layers (FIG. 3) and the nanofiller content (FIG. 4) has been illustrated in FIGS. 3 and 4.

Figure 5:
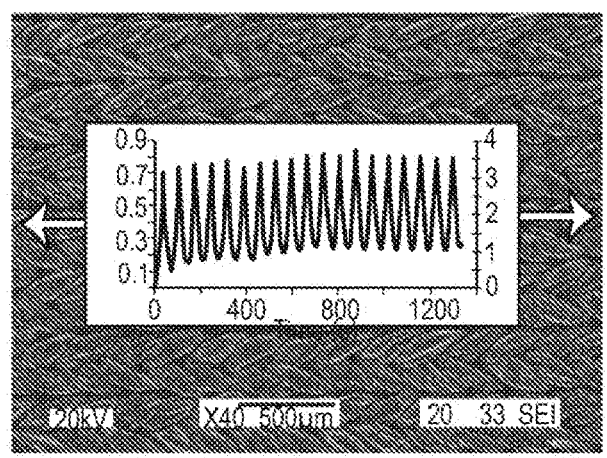
FIG. 5 represents the response of a CPC sensor deposited on a lycra fabric.

Furthermore, sLbL is a very versatile technique which makes it possible to carry out deposits on any type of surface provided that it has a surface energy compatible with the constituents of the solution to be sprayed. In FIG. 5, this technique was carried out on a textile and in FIG. 6 it was carried out on a non-conductive fiber, namely a glass fiber.

Figure 6:
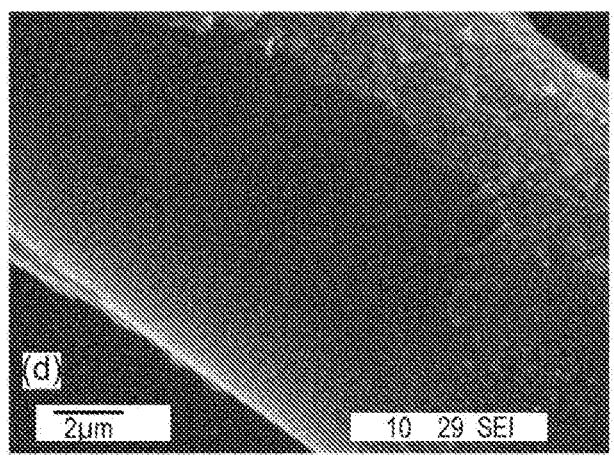
FIG. 6 represents a CNT film deposited on a glass fiber.

The response of a CPC sensor deposited on a lycra fabric has been illustrated in FIG. 5, by illustrating the relative resistance (%) as a function of time (s), and a film of CNT deposited on a glass fiber has been represented in FIG. 6.

The sensitive film created by spraying may thus be formed on a composite sail of a boat in order to monitor the strains thereof, as explained in the article C. Robert, J. F. Feller, M. Castro, Sensing skin for strain monitoring made of PC-CNT conductive polymer nanocomposite sprayed layer by layer, *ACS Applied Materials & Interfaces*, 2012, 4, 7, 3508-3516 or else at the interface of the reinforcing folds and of the resin in composites as explained in the article I. Pillin, M. Castro, S. Nag Chowdhury, J. F. Feller, Robustness of carbon nanotube sensing interphase to probe composites' interfacial damage in-situ, *Journal of Composite Materials*, doi: 10.1177/0021998315571029, (2015).

In any event, the spraying carried out through a mask, the dimensions of which may be adjusted according to the expected stresses and to the substrate 1 under consideration, on at least two electrodes (cf. FIG. 7) which may be conductive wires or fibers made of carbon or of metal (Cu, Ni, Ag, Au, etc.) of which the contact with, on the one hand, the transducer CPC film 2 and, on the other hand, the cables of the acquisition instruments may be improved by using a conductive adhesive 3 (for example: epoxy base highly charged with silver particles). As appropriate, it is also possible to use interdigitated electrodes deposited directly on the surface by printing (Digidrop microplotter) or by transfer of a conductive ink containing metal particles or carbon-based particles. A protective layer 4 may also be added.

Figure 7:
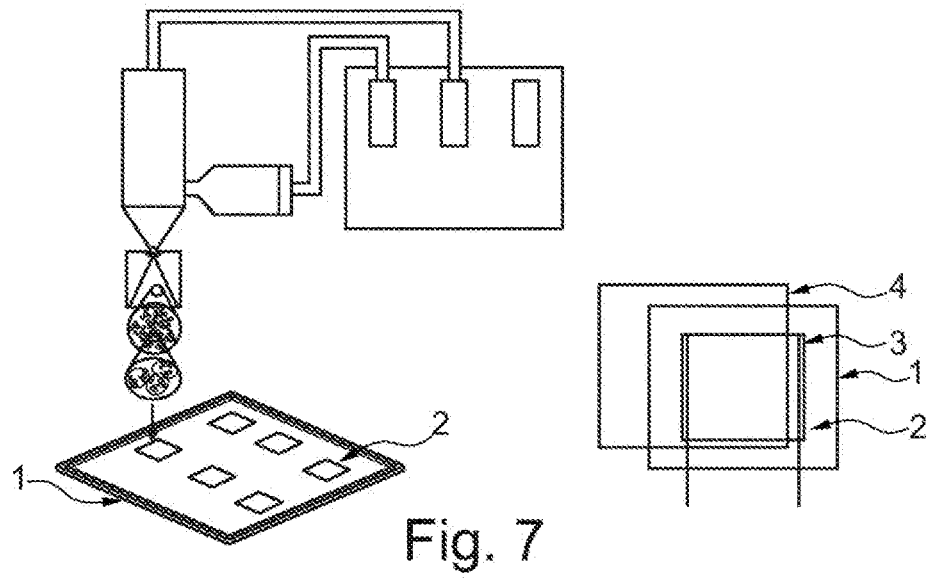
FIG. 7 represents the spraying through a mask and the connection of the CPC transducer with the electrodes: 1) insulating polymer film, 2) CPC sensitive film, 3) electrodes, 4) insulating polymer film.

The spraying through a mask and the connection of the CPC transducer with the electrodes have been illustrated in FIG. 7.

Patch Sensor by sLbL Deposit on Flexible Film

In order to facilitate the production, it may be advantageous to produce the CPC sensors separately and not in situ during the production of the material with which it must be combined, in order to monitor the curing, the health or simply the deformation thereof.

In this case, the term "sensor precursor" is used.

Figure 8:
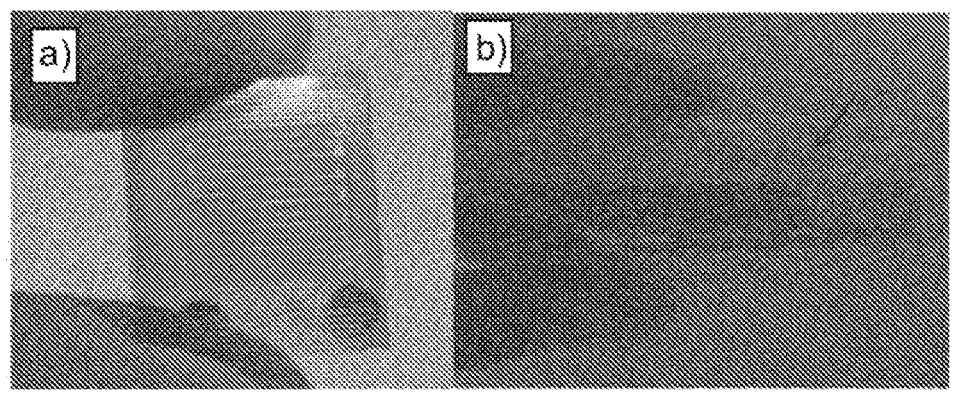
FIG. 8 represents a CPC sensor deposited on a flexible interdigitated electrode (8a) and a CPC sensor deposited on a PET film (8b)

The substrate may be an interdigitated electrode or a transparent PET or PLA film and, in this case, it may be envisioned that the CPC deposit is likewise. A CPC sensor deposited on a flexible interdigitated electrode (8a) and a CPC sensor deposited on a PET film (8b) have been illustrated in FIG. 8.

Figure 9:
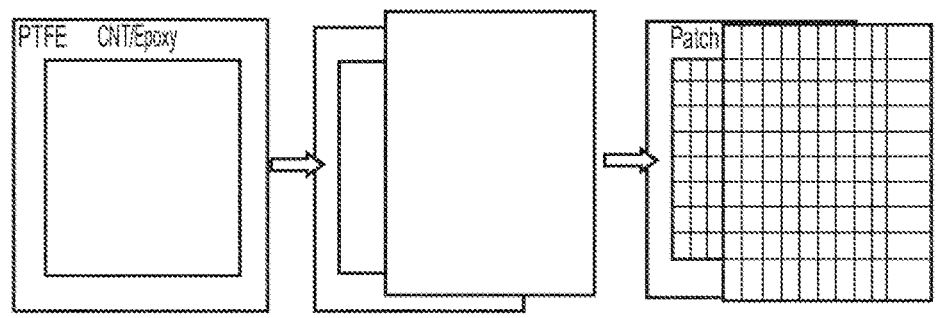
FIG. 9 represents the spraying of the CPC sensor onto a prepreg EP film.

The substrate may be a film of pre-crosslinked resin (prepreg) which, after spraying of the electrically conductive layer of CPC, will be combined at the surface of or in a structural composite and cured therewith. The spraying of the CPC sensor on a prepreg EP film has been illustrated in FIG. 9.

Robust Three-Layer Sandwich

Figure 10:
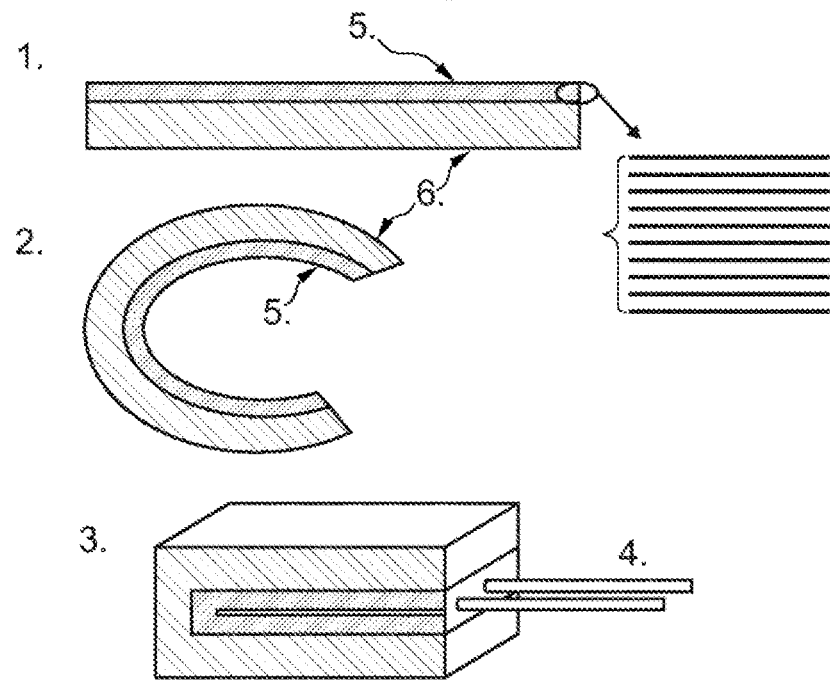
FIG. 10 represents the preparation of a three-layer patch by folding of the multilayer film.

Advantageously, by folding of the film, it will then be possible to produce an insulated and robust three-layer patch, as illustrated in FIG. 10.

According to another of its aspects, the invention also relates to a sensor in which the multilayer structure is folded in two.

Since the CPC sensors are conductive and sensitive, they should be insulated and/or protected against external attacks. The three-layer production process illustrated in FIG. 10 makes it possible to achieve these two objectives.

Electrical Insulation

When the CPC is combined with a composite reinforced with carbon fibers (CFs) which are themselves also highly electrically conductive, it is necessary to insulate them from the CPC otherwise there is a risk of the latter being short-circuited. The three-layer patch of FIG. 10 makes it possible to localize the electrically conductive architecture 5 (the transducer) produced by sLbL in a sandwich between two layers of electrically insulating polymer 6 and to prevent any short-circuit with the CFs of the composite.

Resistance to Environmental Attacks

In order to limit the effect of environmental factors on the piezoresistive performance levels of the CPC, the influence of temperature, humidity and water on the piezoresistive response of the protected three-layer CPCs was tested. The effects of the environmental factors, temperature, relative humidity, and salt water on the piezoresistive performances of the three-layer CPC have been illustrated in FIG. 11.

Figure 11:
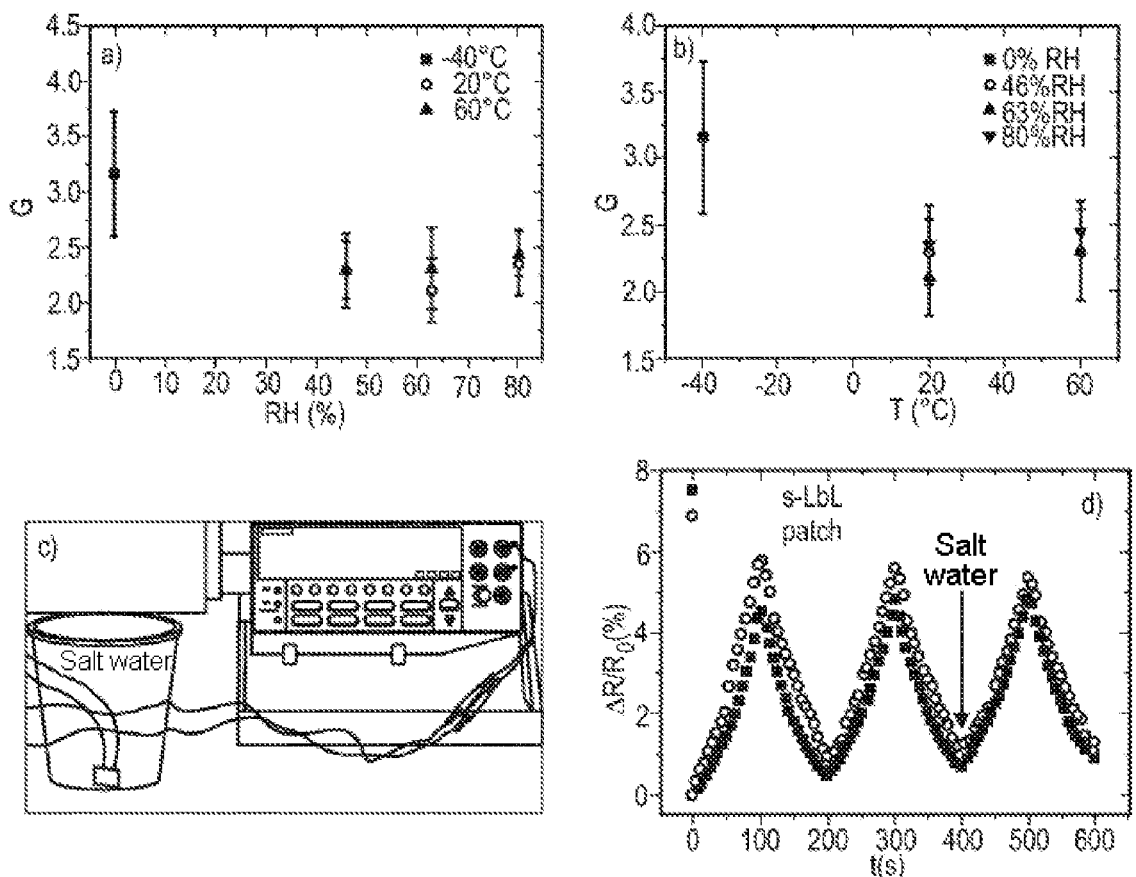
FIG. 11 shows the effects of environmental factors, temperature, relative humidity and salt water on the piezoresistive performance levels of the three-layer CPC.

The effect of humidity on the CPC sensitivity at various temperatures: $-40°$ C., 20 and $60°$ C. for 5 hours, has been illustrated in FIG. 11 a). Relative humidity has no effect on the detection behavior. Regarding the effect of temperature, it has been illustrated in FIG. 11 b) that a greater sensitivity (higher gauge factor G) is obtained at $-40°$ C., but is counterbalanced by a lower stability, whereas between 20 and $60°$ C., the CPCs tested exhibit unchanged sensitivity and unchanged stability. FIG. 11 c) also shows that a three-layer CPC is always functional with respect to the detection of deformation after 3 months of aging in salt water and exhibits no change in nature of its electrical signals, contrary to unprotected sensors which are rapidly out of service after a few moments of immersion. The influence of drops of salt water projected onto a protected three-layer CPC, on its piezoresistive behavior, was also tested in a tensile test. The results of FIG. 11 d) show that this disruption supposed to simulate operation at sea has no effect on the detection signals of the protected three-layer CPC, thus demonstrating its good level of protection against a humid salty environment between 0 and $60°$ C. The % variation in resistance $\Delta R/R_0$ as a function of time t has been illustrated in FIG. 11 d).

Curing of the CPC Sensor Precursor

The curing of the CPC sensor precursors makes it possible to adjust their conductivity by dynamic percolation; the latter provides an additional adjustable parameter, but also makes it possible to guarantee the stability of the sensor over time, since, if said sensor is too far from its thermodynamic equilibrium, its properties will drift over time.

Curing of the Thermoplastic-Matrix CPCs

If the polymer matrix is thermoplastic, this treatment has the effect of fluidizing it and of promoting the interconnection of the nanoparticles that are dispersed therein by dynamic percolation. This treatment makes it possible to increase the resistivity of the sensor up to a "threshold" value where the resistivity remains constant. When this resistivity value is reached, the curing step is stopped.

Figure 12:
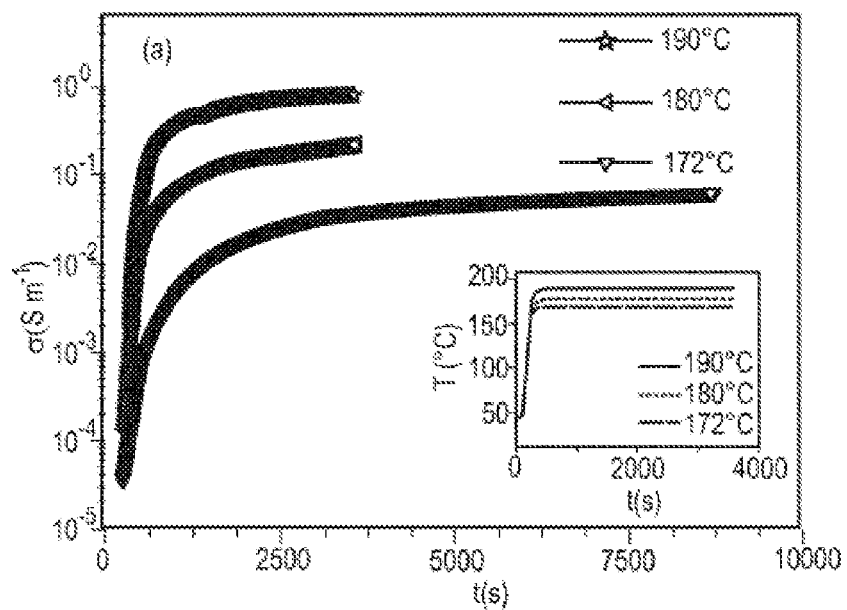
FIG. 12 represents the dynamic percolation of the CNTs in a TPU matrix during stationary temperature phases at 172, 180 and 190° C.

The dynamic percolation of CNTs in a TPU matrix during stationary temperature phases at 172, 180 and 190° C. has been illustrated in FIG. 12. The conductivity σ as a function of the time t has been represented.

Curing of the Thermosetting-Matrix CPCs

Figure 13:
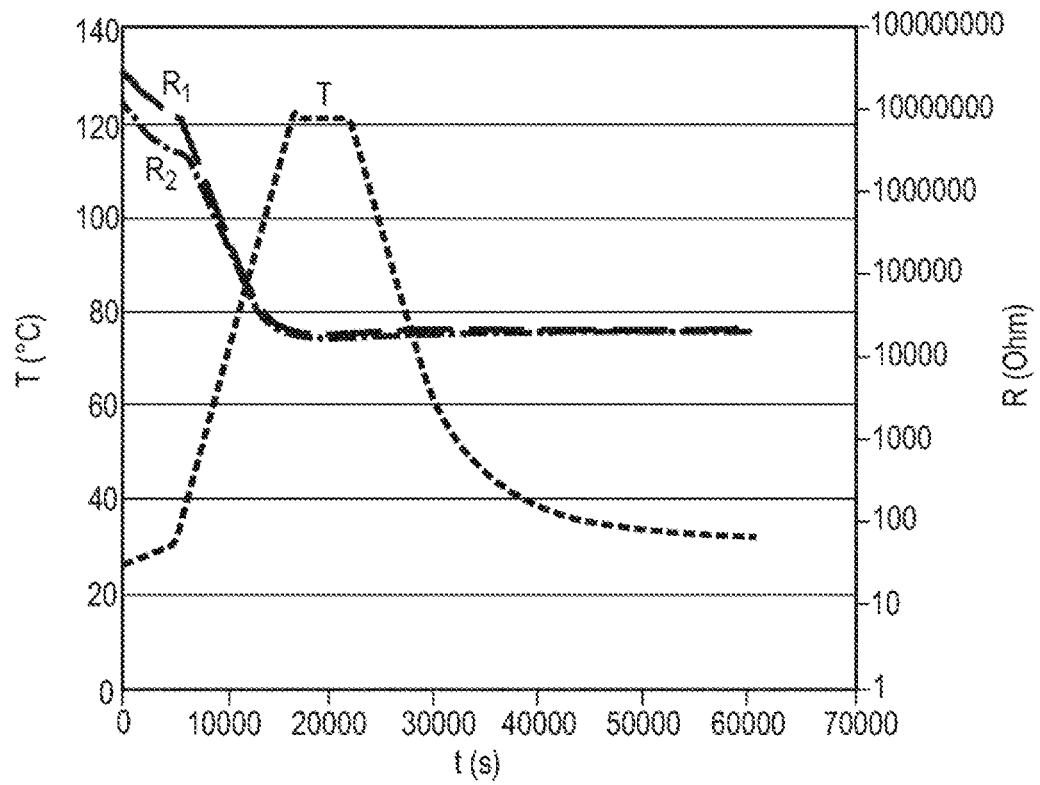
FIG. 13 represents the change in the resistance of the conductive network over time under the effect of the application of a heat cycle.

For the thermosetting-matrix sensors, the effect of the curing is to cause the degree of crosslinking to vary, which causes aggregation of the conductive nanoparticles and thus decreases the resistance of the conductive network, as is seen in FIG. 13. The temperature T and the resistances R1 and R2 of two different sensors, as a function of the time t, has been illustrated.

Figure 14:
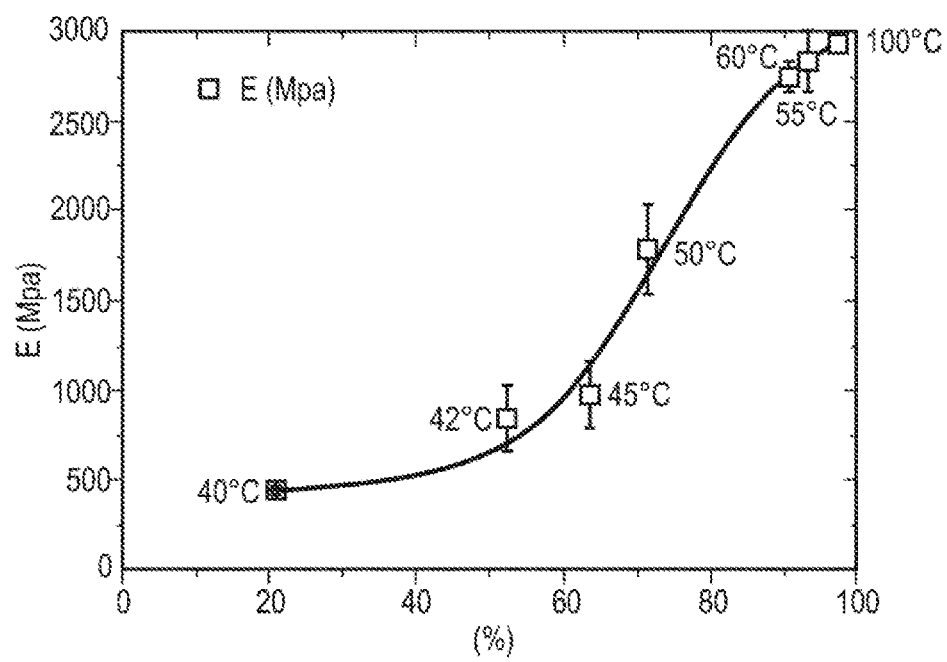
FIG. 14 represents the change in the resistance (Young's modulus) during the curing of the EP thermosetting polymer matrix.

The change in the resistance (Young's modulus E) during curing of the EP thermosetting polymer matrix (%) has been illustrated in FIG. 14.

The conditions for curing the EP resin make it possible to control the mechanical properties (FIG. 14) and electrical properties of the CPC sensors.

Leaktight Seal

A subject of the invention is also, independently or in combination with the aforementioned, a leaktight seal comprising a sensor as defined above.

A leaktight seal consists of a deformable material intended to be tightened between assembly elements (for example: flanges, tubes, etc.) in order to prevent leakage of the fluid contained in said assembly elements.

Leaktight seals are present in all devices in which a fluid is circulated.

In order to ensure correct operation thereof, a leaktight seal is subjected to a tightening force which must not exceed a maximum pressure causing the unacceptable creep of the material of the seal under tightening, but sufficient to maintain the minimum pressure required for the assembly of the seal in order to achieve the desired level of leaktightness under operating conditions.

However, there remains a need to monitor the state of health of the material, in particular there remains a need to know the degree of mechanical stress of the seal, which would make it possible to detect any leakages of the fluid contained in said assembly elements. It is also possible to monitor the damage of seals under the effect of physical and/or chemical aging or under irradiation.

However, during the operation of the device in which said seal is placed, it is very difficult to have access to the seal; consequently, there is at the current time no device or method which makes it possible to obtain reliable information during the operation of the device in which a fluid is circulated.

Despite the difficulties due to the position and to the operating conditions of the devices in question, the inventors have shown, surprisingly and advantageously, that the sensor according to the invention may be used to obtain the required information at a seal without modifying the operation of the device to be controlled.

Thus, the sensor according to the invention may be placed in various places on the seal, in particular at the surface or in the core, and it may thus be judiciously placed according to the geometry of the seal at the places where the collection of information is the most relevant.

Once the seal is in place, the sensor makes it possible to continuously obtain information in particular on the mechanical state of the seal. By placing a sensor on the external face of the seal, that is to say outside the assembly element, information regarding any leakage of the fluid may be obtained.

In addition, the information obtained may be qualitative or quantitative in nature.

The use in the form of patches also makes it possible to distribute the sensors over the entire device to be controlled. A judicious distribution of the patches may make it possible to obtain both local information, at each patch, and general information, by taking into consideration the information obtained by all of the patches, making it possible to obtain information on the state of the entire device to be controlled.

The leaktight seal may be chosen from the following list, which is not limiting: elastomer seal, seal made of fiber-elastomer composite material, graphite seal, PTFE seal, modified PTFE seal, metalloplastic seal, spiral seal, metalloplastic seal, serrated seal, O-ring seal.

In the case of a leaktight seal, the addition or the integration of a CPC sensor may provide information on the level of mechanical stress of the seal, on the compromising of its integrity by chemical agents or else on any degradation that may be caused by a leak.

The seal may comprise at least one sensor or one sensor precursor configured for detecting a leak of a chemical compound, the chemical compound being for example chosen from the following list, which is not limiting: $H_2O$, $H_2$, $O_2$, $CO_2$, $CH_2O$, $CHCl_3$, $C_6H_6$, $CH_3OH$, $CH_3CH_2OH$, and other volatile or liquid organic compounds, such as chlorinated solvents, alcohols, ketones, aldehydes, etc.

The sensor may be configured such that the detection is possible as soon as a very small amount of about a few parts per million (ppm) of the chemical compound is present.

The CPC sensors are easy to use, by virtue of their adaptability. They may be integrated into a seal in various ways, for example via the molten route or in solution. In the latter case, they may be structured in nanometric multilayers and integrated into or on varied supports.

Monitoring of the Health of Seals (Leaks, Pressure, Temperature)

Nanotube-based films are in particular used for controlling devices, for instance seals at the surface or in the core.

For this, it is possible to deploy a network of sensors according to the invention based on conductive polymer nano composites (CPCs) loaded with CNTs and/or with graphene lamellae GRs dispersed in a polymer or elastomer matrix (for example: EP, TPU) at the surface or in the seal in order to perform a double function: (1) monitoring the tightening force of the seal below which the leaktightness will no longer be ensured; (2) detecting a leak which perhaps comes from fluid diffusion under operating conditions.

Figure 15:
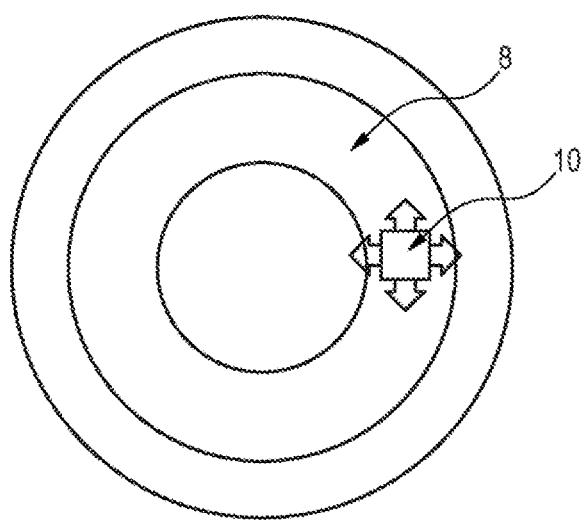
FIG. 15 represents the structure of a seal sandwiched between two flanges.

The sensor may be placed at the surface of the seal. The structure of a seal 8 intended to be sandwiched between two flanges and the possible arrangement of the CPC sensor 10 at its surface have been illustrated in FIG. 15.

Figure 16:
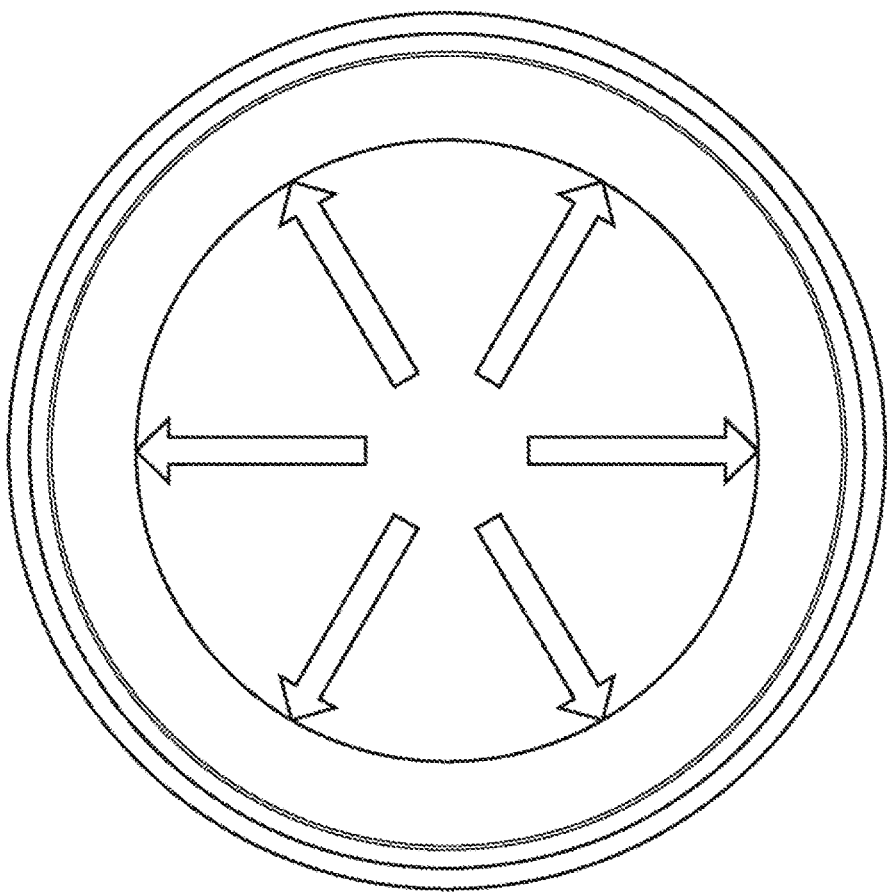
FIG. 16 represents a flat seal carrying a sensor having a circular shape.

A flat seal 12 carrying a sensor 14 having a circular shape has been illustrated in FIG. 16. It may be a single sensor or a set of sensors arranged in a circle.

Generally, the sensor may be placed at the surface or on the edge of the seal.

These CPC sensors are also particularly sensitive with respect to a variation in temperature or in organic vapor diffusing through a polymer membrane. Consequently, the CPC-based sensors may also make it possible to develop monitoring and security systems, for rapidly giving a warning in the event of failure of a seal. The advantage of the technology proposed also comes from the ease with which the CPCs are produced, said ease making possible a low-cost, large-scale production, and requiring no heavy industrial investment for adapting existing seal production processes.

By way of formulation example, from 4 to 8 g·dm$^{-3}$ of a mixture containing 98% by weight of EP and 2% of CNTs are dispersed in chloroform with a view to subsequent spraying; this type of formulation may particularly be suitable for monitoring the compression of a seal if the expected deformations are low <0.5%.

If it is desired to monitor more substantial deformations, and if the constraints of use allow it, the EP matrix should be replaced with a polymer that has a lower modulus and is of elastomer nature, such as a thermoplastic poly(urethane) (TPU) that will be dissolved in tetrahydrofuran (THF) in which 3% w/w of CNTs will be dispersed.

The use of leaktight seals comprising a CPC sensor according to the invention is presented in the section devoted to the examples. More particularly, the sensitivity of the CPCs to pressure, to temperature and to organic vapors has been tested.

Uses

Application in Structural Composites (Boating, Wind-Turbine, Automobile, Aeronautical Industries)

State of the Art Regarding Structural Composite Health Monitoring (SHS)

Generally, various techniques exist for achieving composite structure health monitoring: metal gauges, ultrasound, optical fibers, accelerometer, CPC sensors. The objective of the monitoring of deformation and damage of composite structures is both to optimize their maintenance (offshore wind turbines, aeronautical industry) and to anticipate the catastrophic rupture thereof (blades, wind-turbine poles, wings, aircraft sections, masts, floats, sailboat hydrofoils, chassis, car bodywork).

Optical Fiber Sensors

However, the size of the core of the fibers is between 50 and 150 μm, which which results in the sensors relative intrusive elements when they are inserted into composites of which the fibers have a diameter of 10 μm. Furthermore, optical fibers are sensitive to organic compounds, such as moisture or certain polymer reagents; it is therefore necessary to protect them by means of a polymer sheath, which also makes them more compatible with the polymer matrix of the composite. This operation further contributes to increasing the diameter of the optical fibers by 60 to 100 μm.

Furthermore, optical fibers detect only elongations in an elastic deformation range, where no damage occurs, but it is precisely damage that it is sought to characterize.

Finally, the cost of the instrumentation required for the acquisition and processing of the optical signals does not allow large-scale development thereof for covering large composite parts and producing networks.

Ultrasonic Sensors

Ultrasonic sensors make it possible to detect the rupturing of fibers or of the fiber-matrix interface, but not the deformations, and may not easily locate the damage since they are not core-integratable. Reinforcing materials may absorb the ultrasound and make it difficult to interpret the signals. In practice, they serve merely to determine whether the level of deformation not to be exceeded has been reached, but it is then generally too late.

Metal Gauges

Metal gauges are heterogeneous; they must be adhesively bonded, they are not integratable, and their sensitivity is low with respect to QRSs, the gauge factor of which may be adjusted according to the deformation range of the material to be monitored.

Accelerometers

Accelerometers are large in size, which does not allow them to be core-integrated, and requires adhesive bonding at the surface of the materials of which it is desired to monitor the health. Furthermore, they must be very accurately positioned with respect to one another.

It is difficult to predict the rupturing of structural polymer composites because the cracks that may exist inside, in particular at the interface between the reinforcing fibers and the polymer matrix, may cause damage to the material without any warning sign particularly at the surface.

It is therefore very advantageous to be able to develop a composite health monitoring system that is as non-intrusive as possible, that is to say small in size and compatible or even identical in nature with respect to that of the composite, and that provides information on the level of deformation and the presence of cracks before complete rupture. The sensor according to the invention has an effect in terms of storage of the damage and stress undergone by the material to be monitored.

The sensors according to the invention meet this need.

In addition, the sensor according to the invention may also be used for monitoring curing of composites or controlling composite molds which are used to produce them or else for monitoring the process of curing the composite structure in situ.

Figure 17:
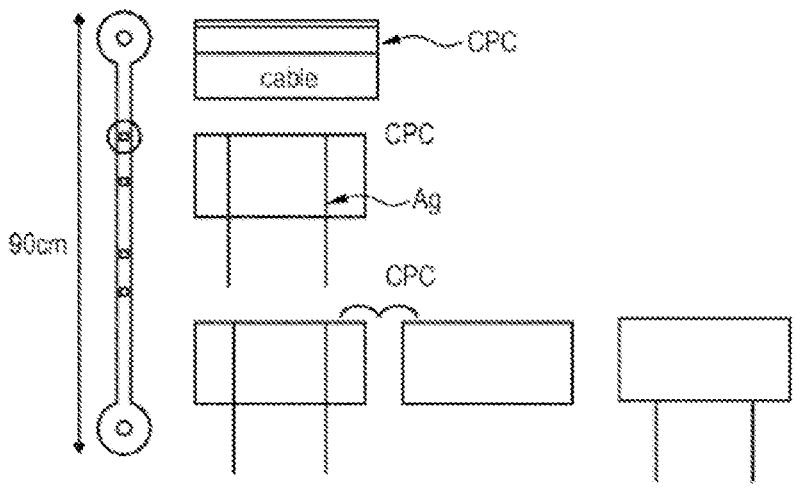
FIG. 17 represents a CF-EP composite cable for a sailboat shroud, instrumented by CPC sensors.

A CF-EP composite cable for a sailboat shroud instrumented by CPC sensors has been illustrated in FIG. 17. The sailboat shroud used is made of carbon/poly(epoxy) fiber composite. FIG. 17 presents the arrangement of the CPC sensors on the CF-EP cable of a shroud and also the implantation scheme for the CPC sensors on the CF-EP cable and the connection details.

The EP-CNT sensors were tested beforehand in the laboratory in static mode. According to FIG. 17, four CPC sensors were placed on samples of CF-EP cables of the same nature as those used for the shrouds, but comprising two loops in order to be able to be installed on a tensile testing machine.

Figure 18:
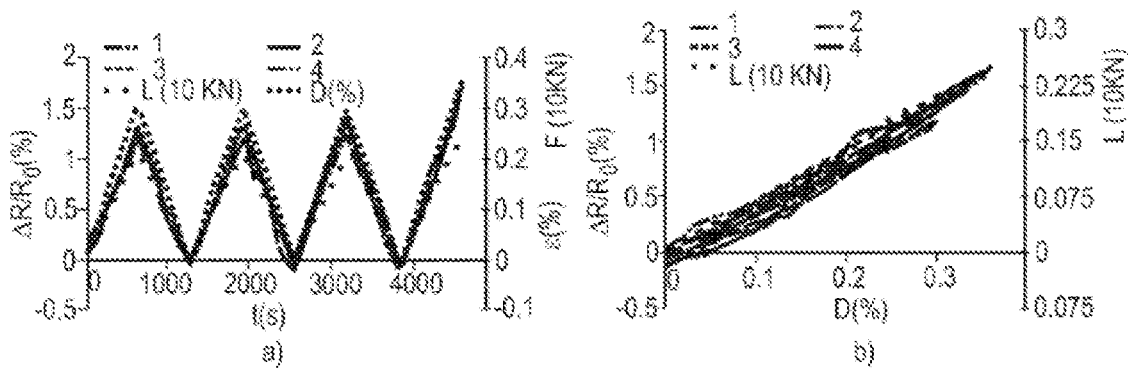
FIG. 18 represents the results of the static tensile tests on the CPC sensors at the surface of a CF-EP cable, for a deformation of less than 0.4%.

Presented in FIG. 18 are the results of the static tensile tests on the CPC sensors at the surface of a CF-EP cable, subjected to a load L. For four sensors 1, 2, 3 and 4, the % variation in resistance $\Delta R/R_0$, the load L and the deformation D have been illustrated as a function of the time tin FIG. 18(*a*) and as a function of the deformation in FIG. 18(*b*). The gauge factor G and the initial resistance $R_0$ for each of the sensors 1, 2, 3 and 4 have been illustrated in FIG. 18(*c*). It is seen in FIG. 18(*a*) that the signals from the four sensors 1, 2, 3 and 4 are reproducible and suitably monitor the deformation D of the cable up to a deformation of 0.3% close to the elastic limit. All the sensors have a gauge factor close to GF=4.5, which represents more than double the sensitivity of the standard metal strain gauges.

Figure 19:
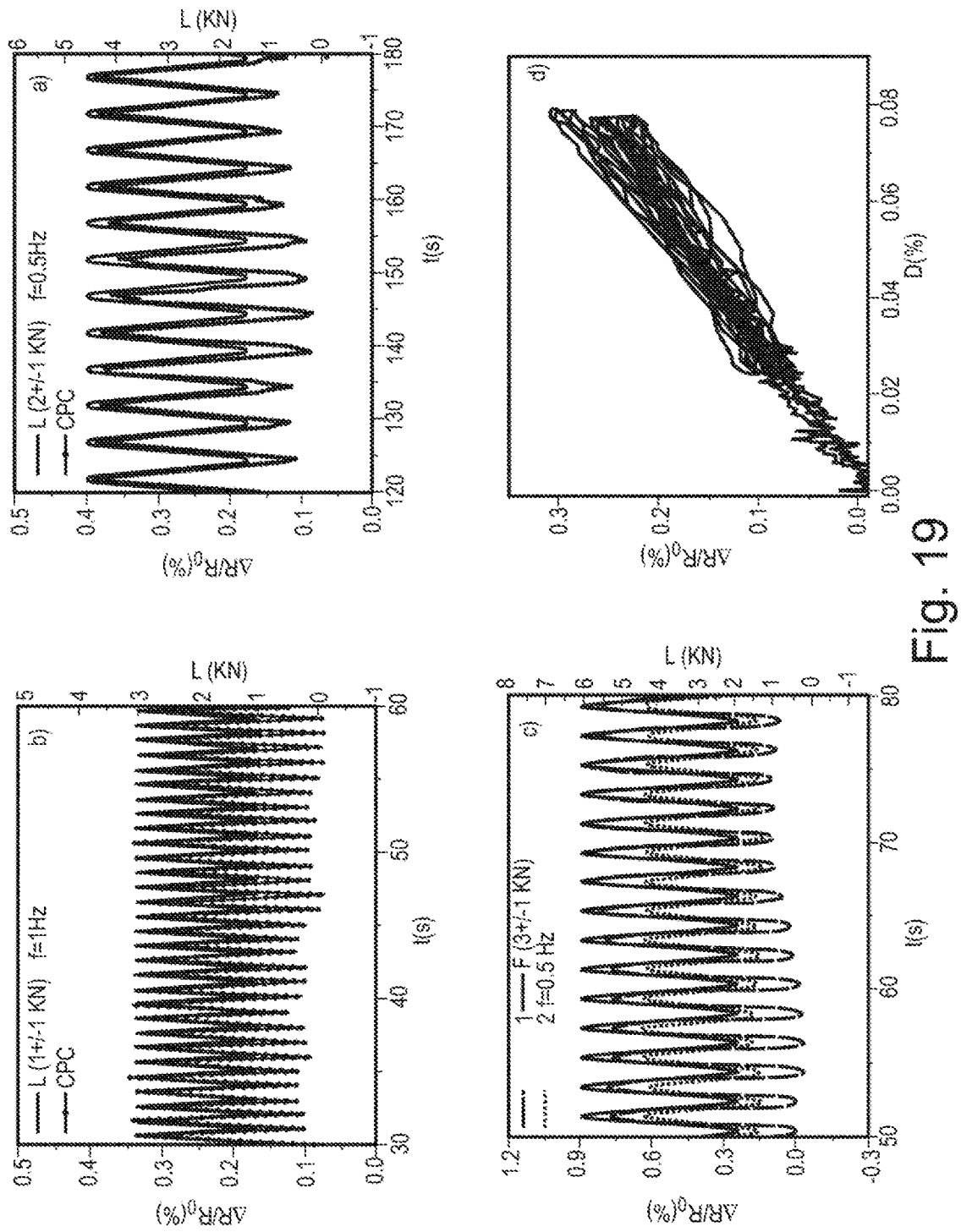
FIG. 19 represents the responses of the CPC sensors in dynamic mode.

The same type of sample was used for dynamic-mode stress tests. Presented in FIG. 19 are the responses of the CPC sensors in dynamic mode at 0.5 and 1 Hz under a stress of ±1 kN. The following have been illustrated for a CPC sensor: the % variation in resistance $\Delta R/R_0$, and the load L as a function of time at a frequency of 1 Hz in FIG. 19(*a*), at a frequency of 0.5 Hz in FIG. 19(*b*), and for two different sensors 1 and 2 at a frequency of 0.5 Hz in FIG. 19(*c*). Finally, the deformation D is illustrated in FIG. 19(*d*). It is seen in FIG. 19 that the sensors monitor very well the rapid deformations at the 0.5 and 1 Hz frequencies.

Figure 20:
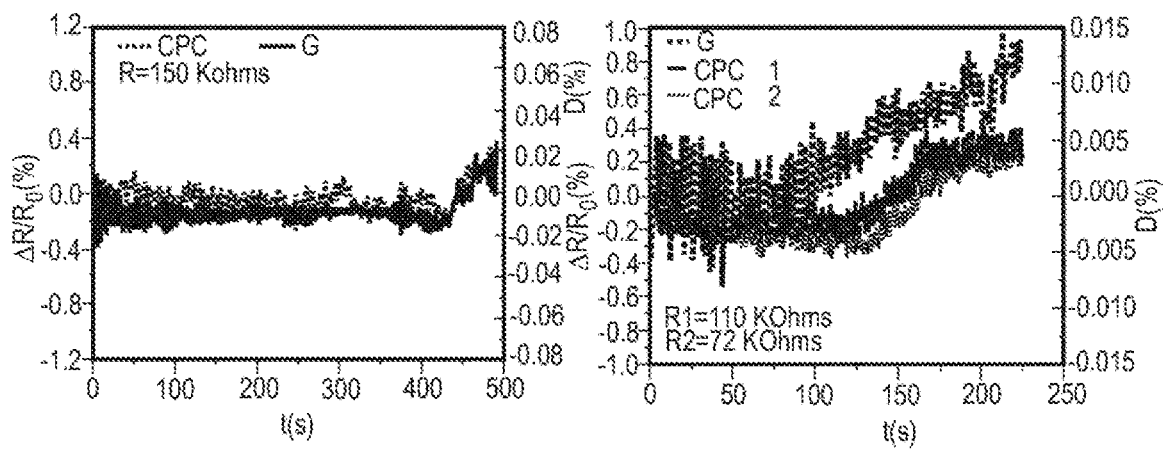
FIG. 20 represents the recordings of 2 CPC sensors and of a metal gauge implemented at the surface of a shroud cable during an outing at sea.
Figure 20:
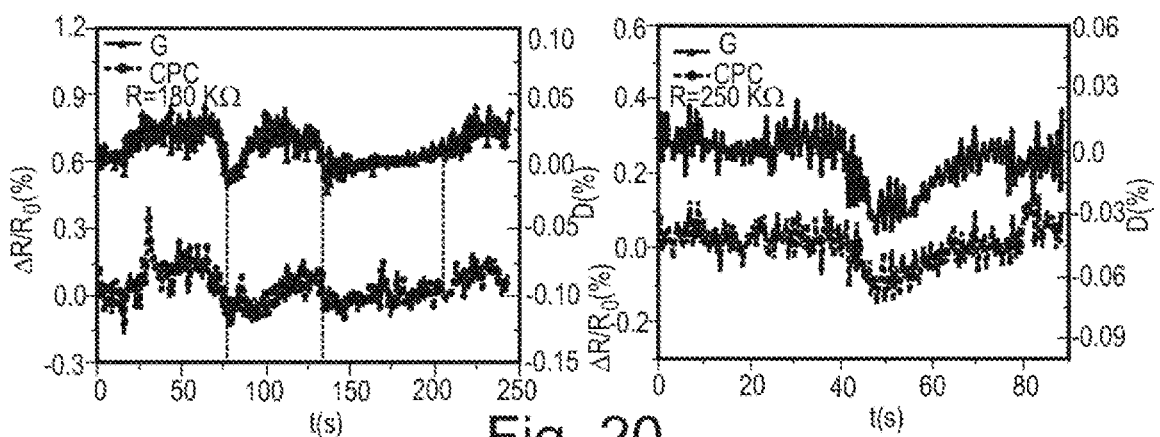

Under the actual mechanical stress conditions during an outing at sea, the recordings reported in FIG. 20 could be obtained.

Presented in FIG. 20 are the recordings of two CPC sensors 1 and 2 and of a metal gauge G used at the surface of a shroud cable during an outing at sea. For the various types of stresses (caused, waves, jibe, etc.) D, the CPC sensors 1 and 2 and the metal gauge G give similar results. Conversely, the signals are more complex to be analyzed than in the laboratory. The % variation in resistance $\Delta R/R_0$, and the deformation D as a function of the time t have been illustrated in FIG. 20.

EXAMPLES

The examples which follow illustrate the invention without limiting the scope thereof.
1. Sensor Examples Example 1

Thermoplastic poly(urethane) TPU films containing 33% by weight of hard segment (Dupont) having a thickness of approximately 1.5 mm were hot-pressed under 20 bar at 160° C. so as to be used as substrates of TPU sensors containing 2% w/w of CNT dispersion in solution in THF with sonication for 1 h.

Example 2

Liquid Route

CPC sensors were produced by dispersing 2% w/w of CNT in BADGE and chloroform with sonication for 1 h.
2. Leaktight Seal Examples
In order to show the use of the CPC sensors according to the invention in seals, the sensitivity of the CPCs to pressure, to temperature and to organic vapors was tested.
Pressure Sensitivity
The piezoresistive properties of two types of CPC sensors under pressure were measured using the dynamic pressure uniaxial test system consisting of a universal test machine (Instron 5566A) instrumented by two electrometers (Fluke 8842A and 8846A) controlled by a program developed under LabVIEW. To test the piezoresistive behavior at pressure, the CPC sensors prepared were connected to a multimeter for measuring resistance. The compression stress imposed by the testing machine was applied perpendicularly to the sensors, giving differential relative resistance responses. The differential relative resistance responses ($A_R$) of the sensors were collected with a Picotest multimeter and defined by the equation below:

$$A_R = \frac{\Delta R}{R_O} = \frac{R - R_O}{R_O}$$

Figure 21:
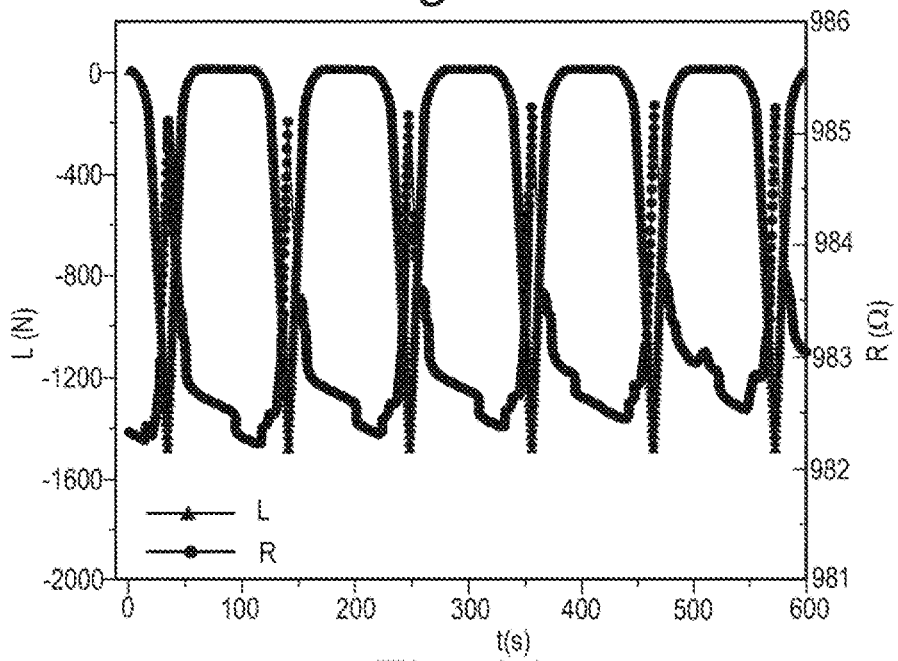
FIG. 21 represents the resistive responses of the CPC sensors in compression: *a*) TPU-3% CNT and *b*) EP-2% CNT.

FIG. 21 illustrates the resistive response (resistance R) of a TPU-3% CNT CPC sensor and the load L applied as a function of the time t.

It is clearly seen in FIG. 21 that the resistive response of the two types of sensors is of NSC (negative strength coefficient) type, that is to say in phase opposition relative to the stress but perfectly synchronous and reproducible.

Figure 22:
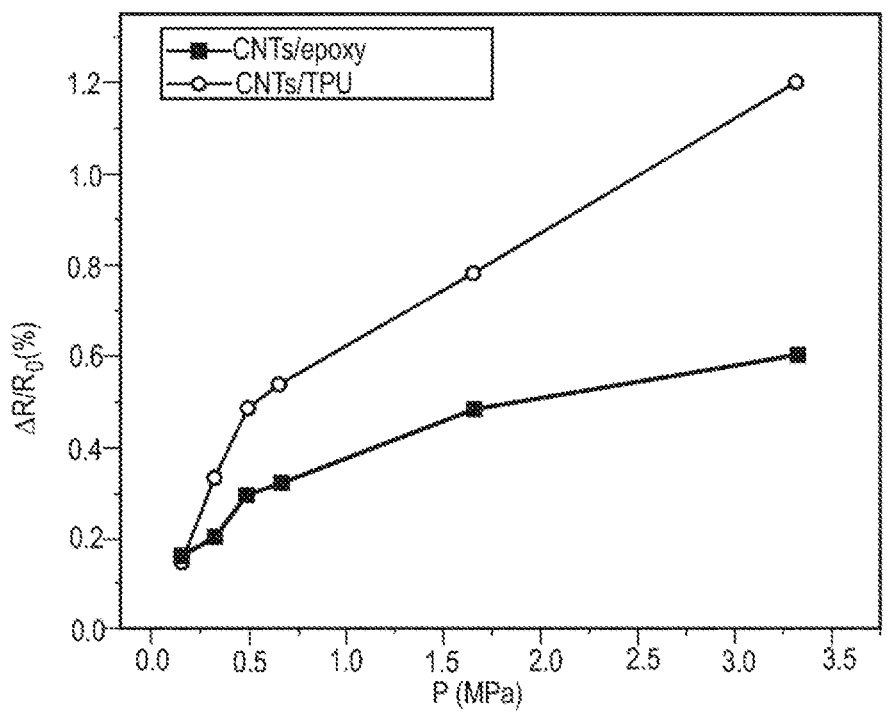
FIG. 22 represents the piezoresistive response of the EP-2% CNT and TPU-3% CNT sensors as a function of the pressure applied.

FIG. 22 illustrates the piezoresistive response, namely the % variation in resistance $\Delta R/R_0$, of the EP-2% CNT and TPU-3% CNT sensors as a function of the pressure P applied. It is seen that, overall, the TPU-3% CNT sensors are more sensitive than the EP-2% CNT sensors.

Figure 23:
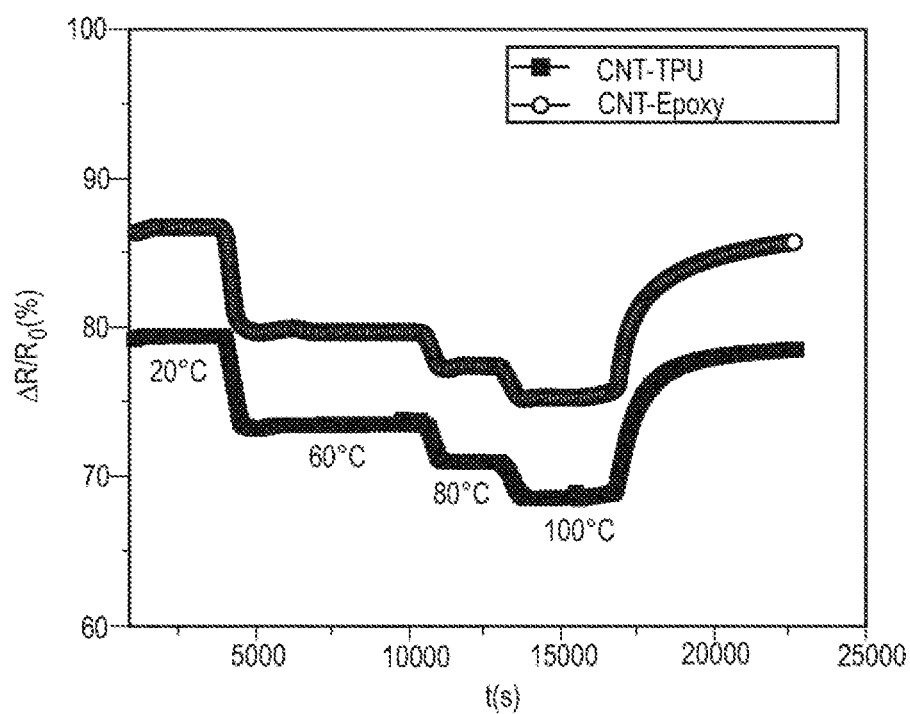
FIG. 23 represents the thermoresistive response of the EP-2% CNT and TPU-3% CNT sensors at temperature levels.
Figure 24:
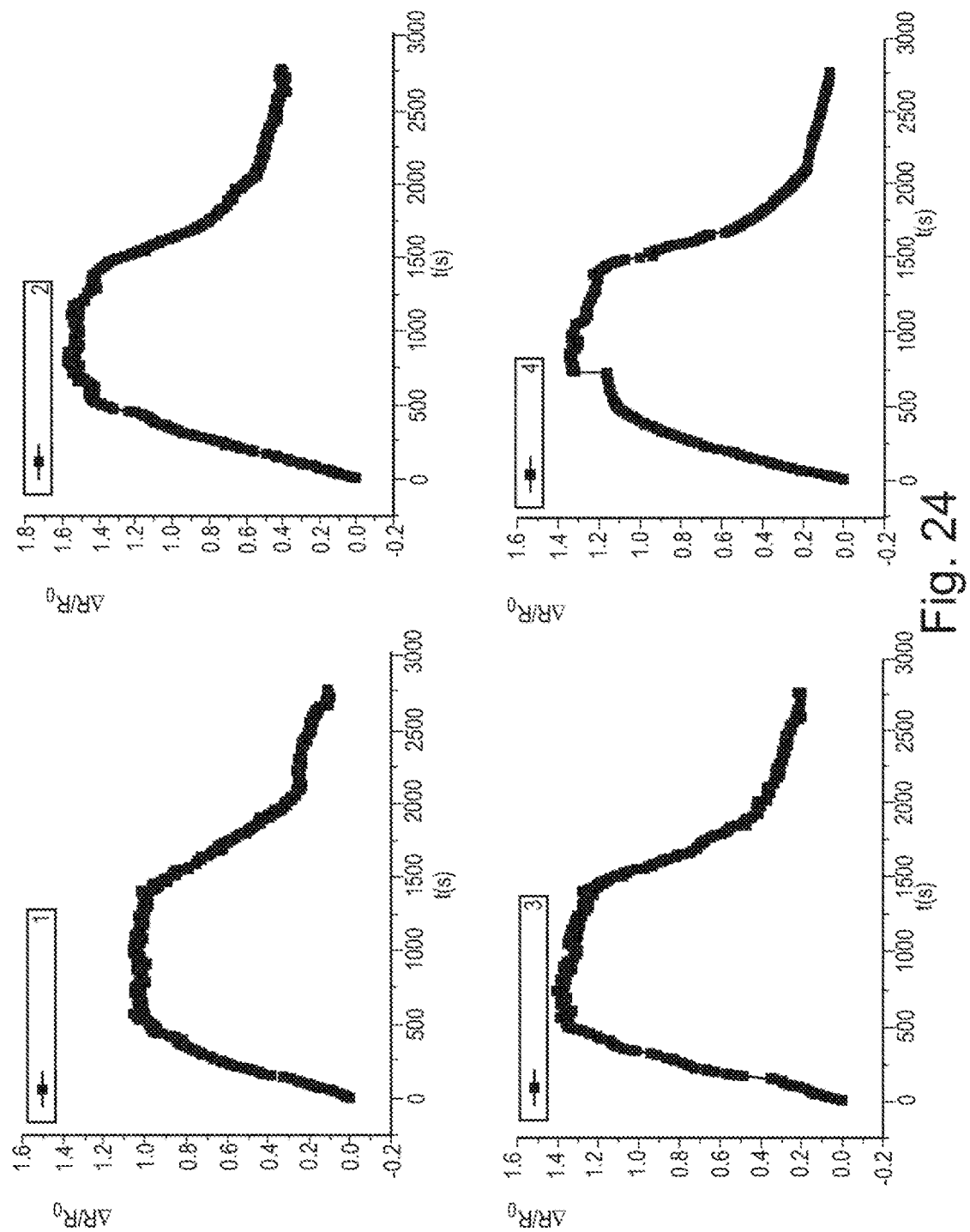
FIG. 24 represents the chemiresistive response of the TPU-3% CNT deposited on a PLA film exposed to THF.
Figure 25:
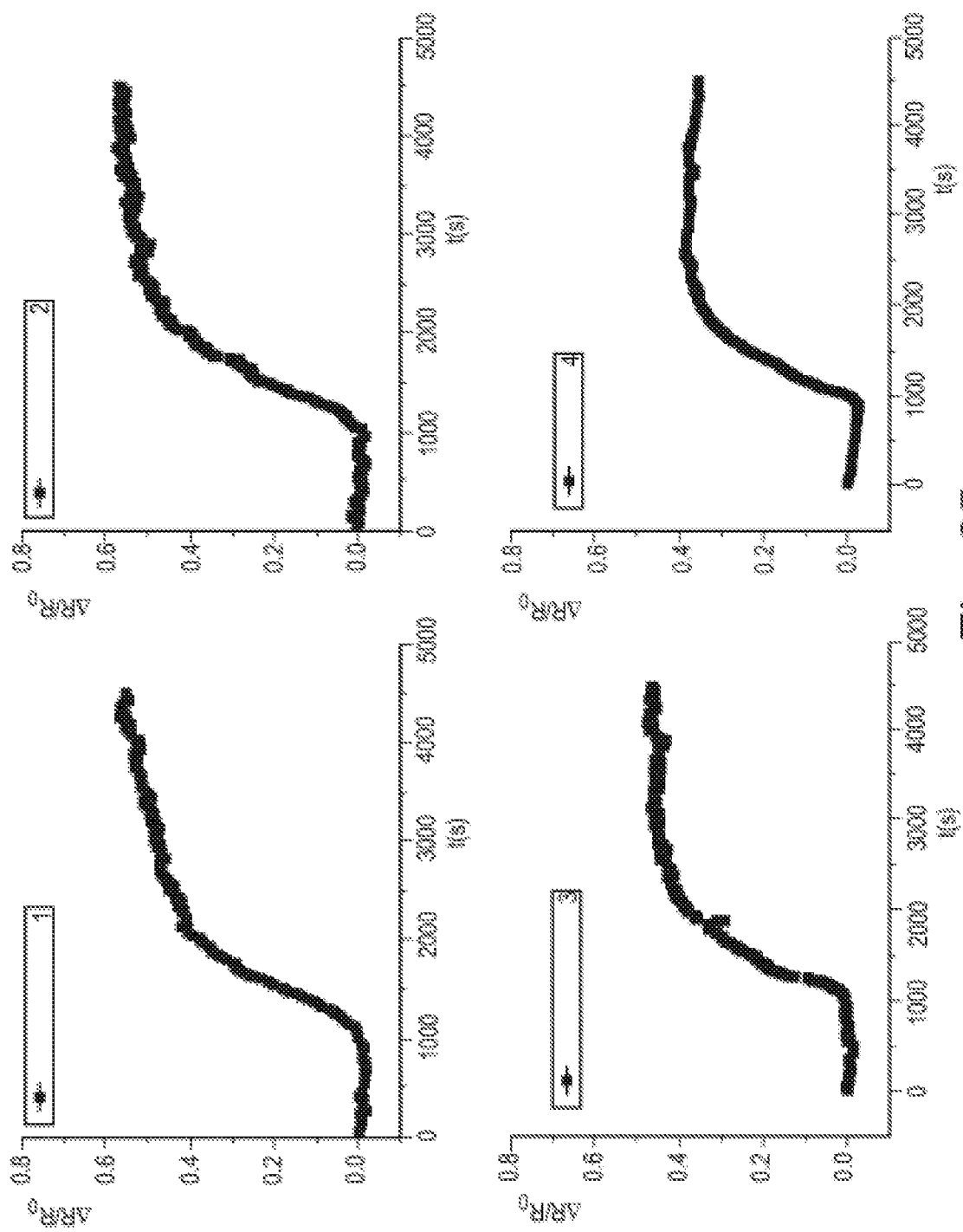
FIG. 25 represents the chemiresistive response of the TPU-3% CNT deposited on a PLA film exposed to $CHCl_3$.
Figure 26:
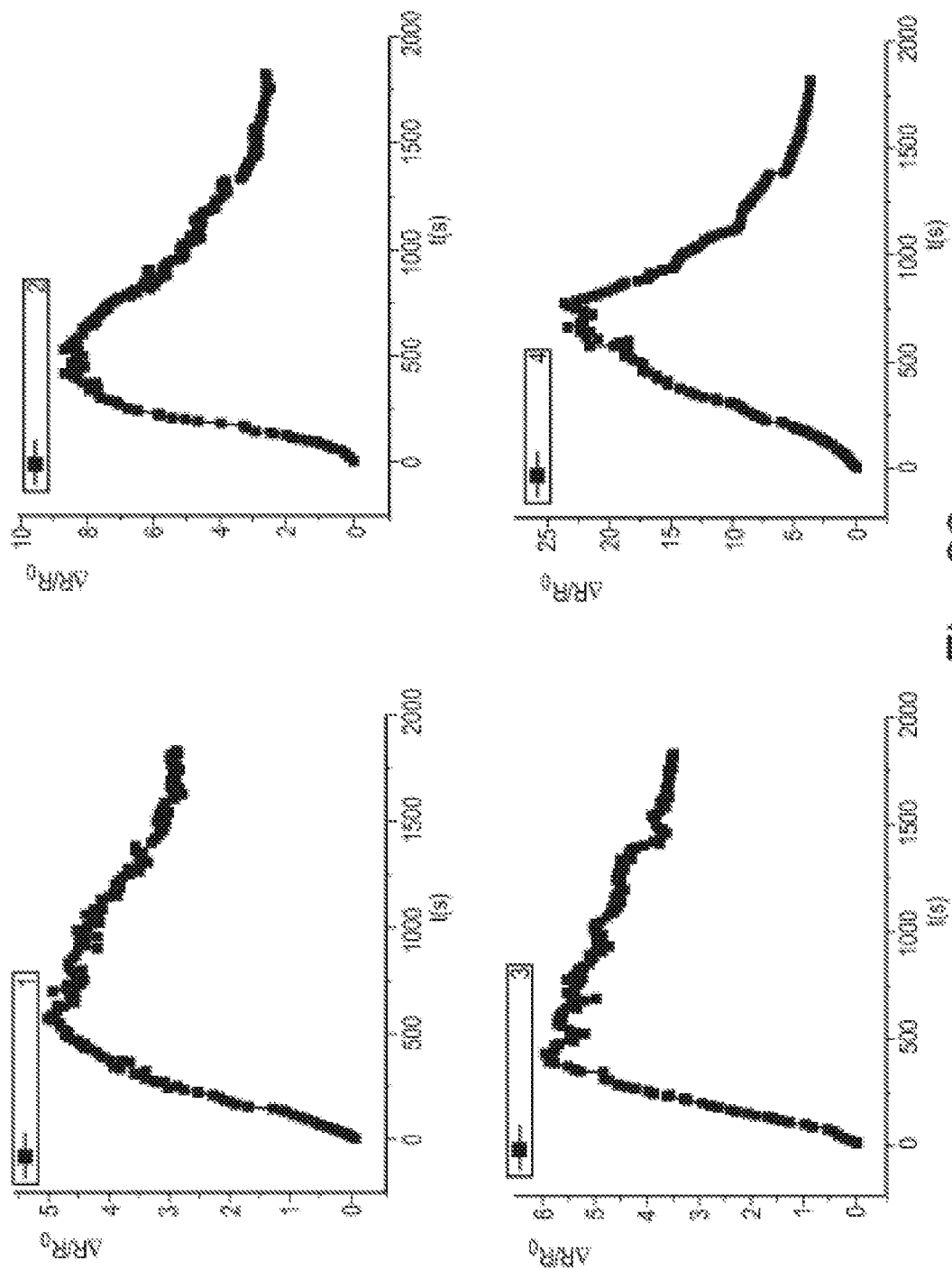
FIG. 26 represents the chemiresistive response of the TPU-3% CNT deposited on a PLA film exposed to toluene.

Temperature-Sensitivity
Presented in FIG. 23 is the thermoresistive response $\Delta R/R_0$ of the EP-2% CNT and TPU-3% CNT sensors at temperature levels, as a function of time.
During the tests, in which the samples are subjected to temperature levels, the two sensors EP-2% CNT and TPU-3% CNT respond with the same dynamics, even though the sensitivity of the first is slightly higher; conversely, when they are subjected to a temperature gradient, the sensitivity of the TPU-3% CNT sensor is higher.
Organic Vapor-Sensitivity
TPU-3% CNT CPC sensors were sprayed onto PLA films in order to verify their VOC-sensitivity and to show their capacity to detect liquid or vapor leaks in the seals.
Presented in FIG. 24 is the chemiresistive response of the TPU-3% CNT deposited on a PLA film exposed to THF. The change in sensitivity of the resistance $\Delta R/R_0$ as a function of time has been illustrated for four sensors 1, 2, 3 and 4. The sensors 1 to 3 are electrode sensors, and the sensor 4 is a film sensor.
Presented in FIG. 25 is the chemiresistive response of the TPU-3% CNT deposited on a PLA film exposed to $CHCl_3$ for the same sensors 1, 2, 3 and 4 as in FIG. 24.
Presented in FIG. 26 is the chemiresistive response of the TPU-3% CNT deposited on a PLA film exposed to toluene for the same sensors 1, 2, 3 and 4 as in FIG. 24.
Conclusion Regarding the CPC Sensors Integratable in Seals
The validation of the concept of CPC sensors comprising a TPU or EP matrix loaded with CNTs produced by LbL spraying on a thermoplastic substrate (TPU) sensitive to pressures of 0.1 to 3.3 MPa was carried out. These piezoresistive sensors gave sensitive, reproducible signals with a low noise, based on the quantum tunnel effect QRS between CNT conductive fillers.
In addition, supplementary experiments also demonstrated that these CPC sensors are sensitive to temperature over a range of 20 to 120° C., and to organic vapors of THF, of chloroform and of toluene when they are deposited on a PLA membrane, suggesting that these CPC sensors may optionally detect fluid leaks.
For applications at higher temperatures, it should be envisioned to change the TPU matrix for a polymer that is stable at higher temperature, such as poly(ether-ether-ketone) PEEK, poly(siloxane) or poly(imide).

The invention claimed is:
1. A sensor for a physical characteristic, comprising a structure comprising:
at least two electrically conductive layers, each layer comprising nanofillers in a polymer matrix comprising at least one polymer, the amount of nanofillers in each electrically conductive layer being greater than a percolation threshold, the percolation threshold being the minimum amount of nanofillers required to render the polymer matrix conductive,
and electrical connection means,
said structure being thermosetting or thermoplastic or being a crosslinkable elastomer,
characterized in that, when the structure is thermosetting, then the degree of crosslinking thereof is greater than 80%, when the structure is a crosslinkable elastomer, then it comprises an amount of crosslinking agent ranging from 5 mol % to 20 mol % relative to the number of moles of the structure, and
when the structure is thermoplastic, then it has a constant resistivity value.

2. The sensor as claimed in claim 1, comprising a number of electrically conductive layers ranging from 2 to 100 layers.

3. The sensor as claimed in claim 1, comprising a layer of substrate on which the electrically conductive layers are deposited, advantageously the substrate is an insulating layer comprising at least one polymer, said polymer being identical to or different than the polymer of the electrically conductive layers.

4. The sensor as claimed in claim 1, characterized in that it is in the form of a patch.

5. The sensor as claimed in claim 1, wherein the multilayer structure is folded in two.

6. The sensor as claimed in claim 1, wherein the nanofillers are chosen from the following list: carbon nanoparticles, carbon black, carbon nanotubes, graphene, fullerene, metal nanoparticles, silver nanoparticles, gold nanoparticles, nickel nanoparticles.

7. The sensor as claimed in claim 1, wherein the electrically conductive layers have a thickness ranging from 20 to 100 nm.

8. The sensor as claimed in claim 1, wherein the polymer matrix comprises a polymer chosen from the following list: elastomer, for example poly(siloxane), poly(urethane), poly(isoprene), poly(butadiene).

9. A process for producing a precursor of a sensor for a physical characteristic, comprising a multilayer structure, comprising the following steps:
a) a solution is prepared by mixing nanofillers and a polymer in a solvent, the amount of nanofillers being greater than a percolation threshold, the percolation threshold being the minimum amount of nanofillers required to render the polymer conductive,
b) a layer of this solution is deposited on an insulating polymer layer,
c) the layer thus formed is left to stand so as to allow the solvent to evaporate off and to form a film called an electrically conductive layer,
d) the electrical conductivity of the electrically conductive layers thus formed is measured,
e) as long as the electrical conductivity of the electrically conductive layer does not reach a predetermined value, steps b) to d) are repeated,
f) optionally, an insulating polymer layer is deposited on the electrically conductive layers thus formed,
wherein steps b) to d) are repeated at least twice.

10. The process as claimed in claim 9, wherein steps b) to d) are repeated from 3 to 99 times.

11. The process as claimed in claim 9, wherein step b) is carried out by spraying.

12. The process as claimed in claim 9, wherein the leaving to stand in step c) is carried out for a period ranging from 1 s to 10 min.

13. A process for producing a sensor for a physical characteristic, comprising a multilayer structure, wherein the process for producing a precursor of a sensor as claimed in claim 9 is carried out on an insulating polymer layer which is made of a thermosetting or thermoplastic material or which is a crosslinkable elastomer, comprising an amount of crosslinking agent ranging from 5 mol % to 20 mol % relative to the number of moles of the structure, said process being followed by a curing step such that:
when the insulating polymer layer is made up of a thermosetting material, the curing step is carried out until a degree of crosslinking of said layer of greater than 80% is obtained;
when the insulating polymer layer is made of a crosslinkable elastomer, the curing step is carried out until a constant crosslinking value is obtained;
when the insulating polymer matrix is made of a thermoplastic material, the curing step is carried out until a constant resistivity value is obtained;
after the curing step, the sensor obtained is cooled or left to cool.

14. The process for producing a sensor as claimed in claim 13, wherein the curing step has a time of between 1 h and 20 h.

15. The process as claimed in claim 13, wherein the curing step consists in heating at a temperature that may reach a maximum temperature for a limited time, the maximum temperature being between 80 and 400° C.

* * * * *

UNITED STATES PATENT AND TRADEMARK OFFICE
CERTIFICATE OF CORRECTION

| | |
|---|---|
| PATENT NO. | : 10,890,498 B2 |
| APPLICATION NO. | : 15/740407 |
| DATED | : January 12, 2021 |
| INVENTOR(S) | : Gabriel Benech et al. |

It is certified that error appears in the above-identified patent and that said Letters Patent is hereby corrected as shown below:

In the Specification

Column 22, Line 44, "function of the time tin FIG." should read -- function of the time t in FIG. --

Signed and Sealed this
First Day of June, 2021

Drew Hirshfeld
*Performing the Functions and Duties of the
Under Secretary of Commerce for Intellectual Property and
Director of the United States Patent and Trademark Office*